US009805387B2

(12) United States Patent
Terashima et al.

(10) Patent No.: US 9,805,387 B2
(45) Date of Patent: Oct. 31, 2017

(54) PROCESSING SYSTEM AND POS SYSTEM

(71) Applicant: Seiko Epson Corporation, Tokyo (JP)

(72) Inventors: Katsutoshi Terashima, Azumino (JP); Yoshihiro Ueno, Matsumoto (JP); Tadashi Furuhata, Shiojiri (JP); Akio Takamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/609,787

(22) Filed: Jan. 30, 2015

(65) Prior Publication Data
US 2015/0234620 A1    Aug. 20, 2015

(30) Foreign Application Priority Data

Feb. 14, 2014 (JP) .................................. 2014-026483
Feb. 25, 2014 (JP) .................................. 2014-033610
Mar. 27, 2014 (JP) .................................. 2014-067046

(51) Int. Cl.
*G06F 3/12* (2006.01)
*G06Q 30/02* (2012.01)
*G06Q 20/20* (2012.01)
*G07F 17/42* (2006.01)

(52) U.S. Cl.
CPC ....... *G06Q 30/0238* (2013.01); *G06F 3/1204* (2013.01); *G06F 3/1221* (2013.01); *G06F 3/1229* (2013.01); *G06F 3/1236* (2013.01); *G06F 3/1242* (2013.01); *G06F 3/1292* (2013.01); *G06Q 20/20* (2013.01); *G06Q 20/209* (2013.01); *G07F 17/42* (2013.01); *Y02B 60/1271* (2013.01)

(58) Field of Classification Search
CPC .... G06F 3/1203; G06F 3/1236; G06F 3/1237; G06F 3/1292; G06Q 20/20; G06Q 20/209; G06Q 30/0238; G07F 17/42
USPC ................................................. 358/1.13–1.15
See application file for complete search history.

(56) References Cited

U.S. PATENT DOCUMENTS

| 8,547,224 | B2 * | 10/2013 | Cho ..................... G01S 5/0236 340/10.1 |
| 9,539,164 | B2 * | 1/2017 | Sanders ............... G01C 21/206 |
| 2002/0161547 | A1 * | 10/2002 | Fidler ..................... H04L 29/06 702/150 |
| 2002/0194266 | A1 * | 12/2002 | Brebner .................. H04L 29/06 709/203 |
| 2004/0139385 | A1 * | 7/2004 | Sakaue ................. G06F 1/3203 715/210 |
| 2010/0039929 | A1 * | 2/2010 | Cho ..................... G01S 5/0252 370/216 |
| 2010/0073718 | A1 * | 3/2010 | Toma ..................... G06Q 50/12 358/1.15 |

(Continued)

FOREIGN PATENT DOCUMENTS

| CN | 103024154 A | 4/2013 |
| CN | 103568606 A | 2/2014 |

(Continued)

*Primary Examiner* — Kent Yip
(74) *Attorney, Agent, or Firm* — Foley & Lardner LLP

(57) ABSTRACT

A printing device 1 has a print unit 21 that prints; a storage unit 23 that stores identification information; and a communication unit 22 that wirelessly transmits a position correction signal S1 including identification information stored in the storage unit 23.

18 Claims, 17 Drawing Sheets

(56) References Cited

U.S. PATENT DOCUMENTS

| | | | |
|---|---|---|---|
| 2011/0018732 A1* | 1/2011 | Cho | G01S 5/0236 340/8.1 |
| 2012/0081717 A1* | 4/2012 | Shuldman | G07F 17/3223 358/1.6 |
| 2012/0150669 A1 | 6/2012 | Langley et al. | |
| 2012/0212778 A1 | 8/2012 | Sakai | |
| 2012/0271725 A1* | 10/2012 | Cheng | H04W 4/008 705/21 |
| 2014/0022576 A1 | 1/2014 | Shima et al. | |
| 2014/0022580 A1 | 1/2014 | Shima et al. | |
| 2014/0084049 A1 | 3/2014 | Shima et al. | |
| 2014/0211254 A1* | 7/2014 | Takeuchi | G06F 3/126 358/1.15 |
| 2015/0002890 A1* | 1/2015 | Okuno | G06F 3/1294 358/1.15 |

FOREIGN PATENT DOCUMENTS

| | | |
|---|---|---|
| JP | 2006-120062 | 5/2006 |
| JP | 2009-070241 | 4/2009 |
| JP | 2009-237655 | 10/2009 |
| JP | 2012-154646 | 8/2012 |
| JP | 2012-171138 | 9/2012 |
| JP | 2012-208886 | 10/2012 |
| JP | 2013-105363 | 5/2013 |
| JP | 2013-222226 | 10/2013 |
| JP | 2013-238977 | 11/2013 |
| JP | 2014-502746 | 2/2014 |
| JP | 2014-040265 | 3/2014 |
| WO | 2012082258 A1 | 6/2012 |

* cited by examiner

PROCESSING SYSTEM AND POS SYSTEM

Priority is claimed under 35 U.S.C. §119 to Japanese Application nos. 2014-033610, filed Feb. 25, 2014; 2014-026483, filed Feb. 14, 2014; and 2014-067046, filed Mar. 27, 2014, which are hereby incorporated by reference in their entirety.

BACKGROUND

1. Technical Field

The present disclosure relates to a printing device, a reading system, and a POS system.

2. Related Art

Systems in which devices communicate wirelessly with wireless terminals (wireless terminal position measurement system) are known from the literature. See, for example, JP-A-2012-154646.

With devices that communicate wirelessly and a system that uses such device, there is the needs that wants to realize such the wireless communication device and the system constitution by low cost.

SUMMARY

With consideration for this problem, the present invention provides a printing device, a reading system, and a POS system that execute processes through wireless communication.

A printing device according to one aspect of the invention includes a print unit that prints; a storage unit that stores identification information used in a position information process; and a communication unit that wirelessly transmits the identification information stored in the storage unit.

Thus comprised, the printing device can wirelessly transmit identification information used by the terminal to process position information. A system enabling position correction by a terminal can thus be built, and the terminal can receive identification information sent wirelessly by the printing device, and execute a position information process using the identification information, without needing to install a specialized device that communicates with the terminal on a wall, for example, or needing to install new equipment for operating the specialized device, by simply installing a printing device wherever a printing device is used. The cost of constructing a system enabling position correction by the terminal can therefore be reduced, and the system can be simplified.

Preferably, the printing device also has a power supply unit that supplies power to the print unit and the communication unit; and a switching unit that changes between a first mode supplying power to the print unit and the communication unit, and a second mode supplying power to the communication unit.

Thus comprised, by changing the operating mode to the second mode when the print unit is not used, the supply of power to the print unit can be stopped and power consumption by the printing device can be reduced.

Further preferably, the switching unit is a power supply switch; the first mode is selected when the power supply switch is on; and the second mode is selected when the power supply switch is off.

Thus comprised, when the power switch is off and the print unit is not used for printing, the operating mode of the printing device changes from the first mode to the second mode, thereby stopping the supply of power to the print unit while enabling transmission of the position correction signal by the communication unit to continue.

A printing device according to another aspect of the invention also has a power supply unit that supplies power to the print unit and the communication unit; a first switch that supplies or interrupts power to the print unit; and a second switch that supplies or interrupts power to the communication unit.

Because the printing device thus comprised has a second switch that turns the supply of power to the communication unit on and off separately from the first switch that turns the supply of power to the print unit on and off, users that do not want the communication unit to transmit the identification information can operate the second switch to turn the supply of power to the communication unit off so that the identification information is not transmitted.

A printing device according to another aspect of the invention also has a control unit that controls the print unit and produces a receipt printed with transaction information.

Thus comprised, a system that enables position correction by the terminal can be constructed by installing a printing device where customer transactions are processed, such as at a checkout counter.

A printing device according to another aspect of the invention also has a control unit that controls the print unit and produces a coupon printed with coupon information.

Thus comprised, a system that enables position correction by the terminal can be deployed by simply installing a printing device where coupons are given to customers, such as at a checkout counter in a store.

A printing system according to another aspect of the invention includes a printing device and a terminal. The printing device includes a print unit that prints; a storage unit that stores identification information used in a position information process; and a communication unit that wirelessly transmits the identification information stored in the storage unit. The terminal includes a data communication unit that wirelessly receives the identification information transmitted by the communication unit; a position information storage unit that stores position information; and a terminal control unit that corrects the position information based on the identification information received by the data communication unit.

A system enabling position correction by a terminal can thus be built, and the terminal can receive identification information sent wirelessly by the printing device, and correct the position information using the identification information, without needing to install a specialized device that communicates with the terminal on a wall, for example, or needing to install new equipment for operating the specialized device, by simply installing a printing device wherever a printing device is used. The cost of constructing a system enabling position correction by the terminal can therefore be reduced, and the system can be simplified.

A printing system according to another aspect of the invention includes a printing device, a terminal, and a management device.

The printing device includes a print unit that prints; a storage unit that stores identification information used in a position information process; and a communication unit that wirelessly transmits the identification information stored in the storage unit.

The terminal includes a data communication unit that wirelessly receives the identification information transmitted by the communication unit; a transceiver unit that sends the identification information and receives position information; and a display unit that displays position information received by the transceiver unit.

The management device includes a reception unit that receives the identification information transmitted by the transceiver unit of the terminal; a position information calculation unit that calculates the position information of the terminal based on the identification information received by the transaction unit; and a transmission unit that sends the position information calculated by the position information calculation unit to the terminal.

Another aspect of the invention is a reading system including a reading device having a reading unit that reads information, a storage unit that stores identification information, and a communication unit that wirelessly transmits the identification information stored in the storage unit; and a terminal having a data communication unit that wirelessly receives the identification information transmitted by the communication unit, and a terminal control unit that generates position information identifying a position, and corrects the position information based on the identification information when the identification information is received by the data communication unit.

Thus comprised, the reading device has a function for wirelessly transmitting identification information used for position correction by the terminal. A system enabling position correction by a terminal can thus be built, and the terminal can receive identification information sent wirelessly by the reading device, and correct the position information using the identification information, without needing to install a specialized device that communicates with the terminal on a wall, for example, or needing to install new equipment for operating the specialized device, by simply installing a reading device wherever a reading device is used. The cost of constructing a system enabling position correction by the terminal can therefore be reduced, and the system can be simplified.

In a reading system according to another aspect of the invention, the communication unit of the reading device preferably sends the identification information when information is read by the reading unit.

Thus comprised, when information is read by the reading unit, the reading device can transmit the identification information and trigger the terminal to correct its position. As a result, when specific information is read by the reading device, the user can have identification information sent from the reading device to the user's terminal for position correction by the terminal.

In a reading system according to another aspect of the invention, the communication unit of the reading device wirelessly transmits a signal reporting information was read when information is read by the reading unit; the data communication unit of the terminal receives the signal transmitted by the communication unit; and the terminal control unit of the terminal corrects the position information based on reception of the signal.

Thus comprised, the reading device can inform the terminal that information was read, and based on this report the terminal can execute the position correction process.

In a reading system according to another aspect of the invention, after correcting the position information, the terminal control unit of the terminal executes a specific process based on the corrected position information.

Thus comprised, the terminal can execute a specific process using more accurate position information after the position information is corrected.

A reading device according to another aspect of the invention has a reading unit that reads information; a storage unit that stores identification information; and a communication unit that wirelessly transmits the identification information stored in the storage unit.

Thus comprised, the reading unit has a function for wirelessly transmitting identification information used for position correction by the terminal. A system enabling position correction by a terminal can thus be built, and the terminal can receive identification information sent wirelessly by the reading device, and correct the position information using the identification information, without needing to install a specialized device that communicates with the terminal on a wall, for example, or needing to install new equipment for operating the specialized device, by simply installing a reading device wherever a reading device is used. The cost of constructing a system enabling position correction by the terminal can therefore be reduced, and the system can be simplified.

Further preferably, the reading unit also includes a print unit that prints; and a control unit that prints with the print unit when information is read by the reading unit.

Thus comprised, the reading device can print with the print unit based on reading by the reading unit.

Further preferably, the control unit prints coupon information with the print unit when information is read by the reading unit.

Thus comprised, the reading device can provide the user with a coupon printed with coupon information by printing coupon information based on reading by the reading unit.

Further preferably, the communication unit wirelessly transmits a signal reporting information was read when information is read by the reading unit.

Thus comprised, the reading device can report that information was read by the reading unit by wirelessly transmitting a signal.

Another aspect of the invention is a POS system including: a POS terminal that executes a payment process and transmits printing information based on the payment process; a printing device including a reception unit that receives the printing information, a signal communication unit that transmits a wireless signal based on reception of the printing information, a network communication unit that transmits the printing information, and a print unit that prints; and a terminal including a signal communication processing unit that receives the wireless signal, and a terminal control unit that executes a process based on the wireless signal.

Thus comprised, when the POS terminal executes a payment process based on a customer transaction, the printing device sends a wireless signal to the user's' terminal, and transmits the printing information received from the POS terminal. The terminal executes a process based on the wireless signal received from the printing device. As a result, the terminal can detect by receiving the wireless signal that a transaction was done, execute a process based on the wireless signal, and provide a specific service to the user. A specific service can therefore be received through the terminal without the user needing to remove and present a membership card, for example.

In a POS system according to another aspect of the invention, the terminal control unit of the terminal generates data based on the wireless signal; the terminal has a data transmission unit that transmits the generated data; and the POS system further comprises a management device with a communication unit that receives the data transmitted by the data transmission unit of the terminal.

Thus comprised, the management device can execute a process based on data received from the terminal.

Further preferably in a POS system according to another aspect of the invention, the printing device has a storage unit that stores position information identifying the where the printing device is located, or identification information identifying the printing device; the wireless signal contains the position information or the identification information; and the data includes the position information or the identification information.

Thus comprised, the terminal can send data including the position information or identification information of the terminal to the management device, and the management device can execute a process using the position information or identification information.

Further preferably in a POS system according to another aspect of the invention, the network communication unit of the printing device transmits the printing information, and the position information or the identification information stored in the storage unit, to the management device; the communication unit of the management device receives printing information, and the position information or the identification information; and the management device has a management device storage unit that relationally stores the printing information, and the position information or the identification information.

Thus comprised, the management device can select the related printing information based on reception of the position information or identification information, and can execute a process based on the selected printing information.

Further preferably in a POS system according to another aspect of the invention, the terminal control unit of the terminal generates a second wireless signal based on the wireless signal; the signal communication processing unit of the terminal wirelessly transmits the second wireless signal to the printing device; and the signal communication unit of the printing device receives the second wireless signal transmitted by the signal communication processing unit of the terminal.

Thus comprised, the printing device can execute a process based on the second wireless signal received according to the transmitted wireless signal.

Further preferably in a POS system according to another aspect of the invention, the wireless signal includes a command requesting user information stored by the terminal; and the second wireless signal contains the user information.

Thus comprised, the printing device can get user information from the terminal and execute a process based on the user information.

Further preferably in a POS system according to another aspect of the invention, the network communication unit of the printing device transmits the user information of the second wireless signal; and the POS system includes a management device having a communication unit that receives the printing information and the user information transmitted by the network communication unit of the printing device, and a management device storage unit that relationally stores the printing information and the user information received by the communication unit.

Thus comprised, the management device can select the related printing information based on reception of the user information, and can execute a process based on the selected printing information.

Another aspect of the invention is a control method of a POS system including a POS terminal executing a payment process, generating printing information, and transmitting the generated printing information to a printing device; the printing device transmitting a wireless signal based on reception of the printing information; and a terminal receiving the wireless signal and executing a process based on the wireless signal.

Thus comprised, a specific service can be received through the terminal without the user needing to remove and present a membership card, for example.

Other objects and attainments together with a fuller understanding of the invention will become apparent and appreciated by referring to the following description and claims taken in conjunction with the accompanying drawings.

DESCRIPTION OF EMBODIMENTS

Embodiment 1

Figure 1:
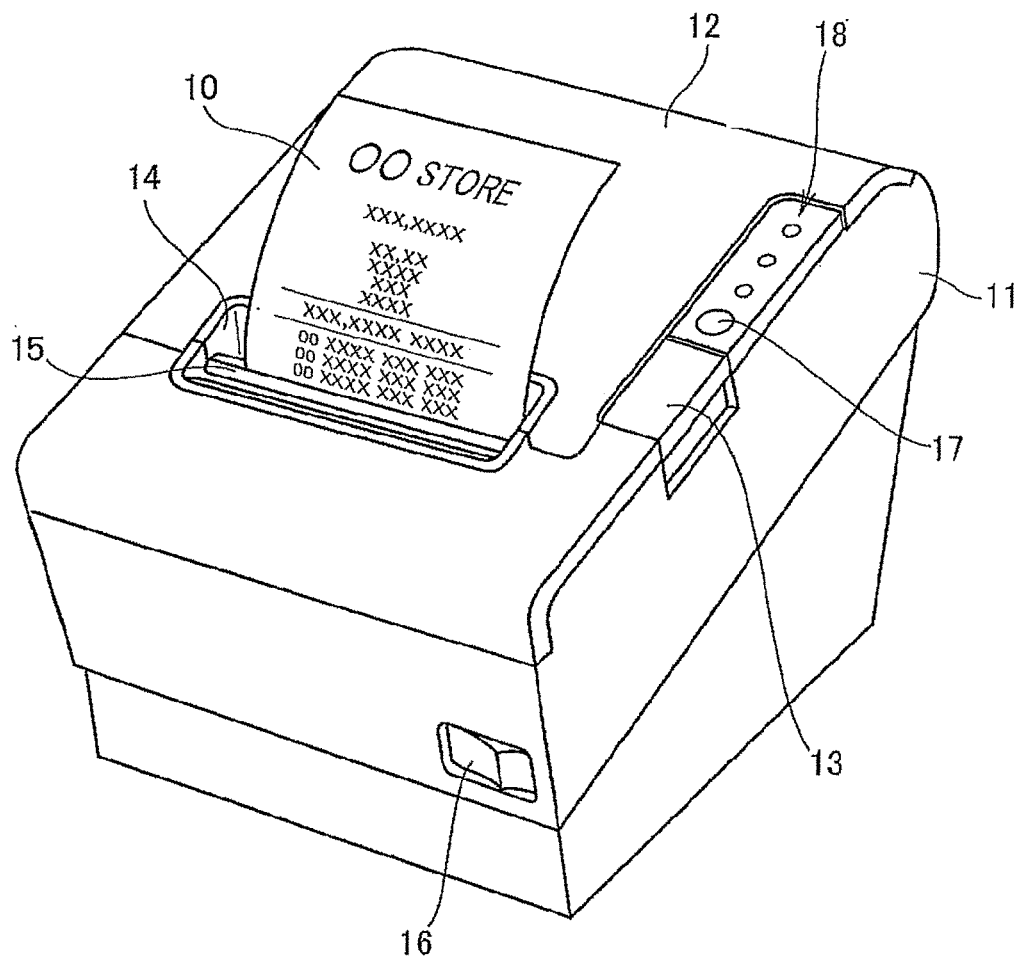
FIG. 1 is an oblique view of a printing device according to a first embodiment of the invention.

FIG. 1 is an oblique view of a printing device 1 according to a first embodiment of the invention.

The printing device 1 in this embodiment of the invention is a thermal line printer. The printing device 1 stores roll paper 10 inside the case 11. The printing device 1 conveys the stored roll paper 10 and prints on the roll paper 10 with a thermal head disposed inside the case 11. An access cover 12 that opens and closes is also disposed to the case 11. The access cover 12 is opened by depressing the lever 13 disposed to the top of the case 11. When the access cover 12 opens, the roll paper compartment where the roll paper 10 is stored is exposed, and the roll paper 10 can be replaced.

A paper exit 14 from which the roll paper 10 is discharged is formed in the top of the case 11 of the printing device 1. A cutter mechanism 15 that cuts the roll paper 10 is disposed inside the paper exit 14.

An operating panel is disposed to the top of the case 11 of the printing device 1 behind the lever 13, and an operating switch 17 that instructs feeding the roll paper 10, and one or more LEDs 18 that indicate states of the printing device 1, are disposed to this operating panel.

A power switch 16 (selector unit, first switch) for turning the printing device 1 power on and off is disposed at the front of the case 11 of the printing device 1.

The printing device 1 also has a function for sending a position correction signal S1 by wireless communication as described below.

The printing device 1 can be used as described below, for example.

The printing device 1 may be installed in a shopping center, supermarket, convenience store, restaurant or other food service business, and prints receipts and coupons. The printing device 1 is typically disposed to a checkout counter in the business. A host computer 2 (FIG. 2) functioning as a POS terminal communicatively connects to the printing device 1. The printing device 1 produces receipts and coupons as controlled by the host computer 2.

While not shown in the figures, a barcode reader that reads barcodes from products or product packaging, and a card reader that reads cards such as customer membership cards, connect to the host computer 2. The host computer 2 accesses a POS server not shown to acquire specific information from product master and customer master databases stored by the POS server. Based on input from the barcode reader, card reader, and input by the checkout clerk to input means such as a keypad according to the customer transaction in the store, the host computer 2 acquires information from the product master and customer master databases and generates receipt control data. This receipt control data is data instructing producing a receipt printed with information related to the payment made by a customer for the transaction. The host computer 2 sends the generated receipt control data to the printing device 1, and thereby causes the printing device 1 to print a receipt.

As may be required, the host computer 2 generates and sends coupon control data instructing producing a coupon printed with coupon information to the printing device 1. The printing device 1 then produces a coupon printed with the coupon information based on the received coupon control data.

Figure 2:
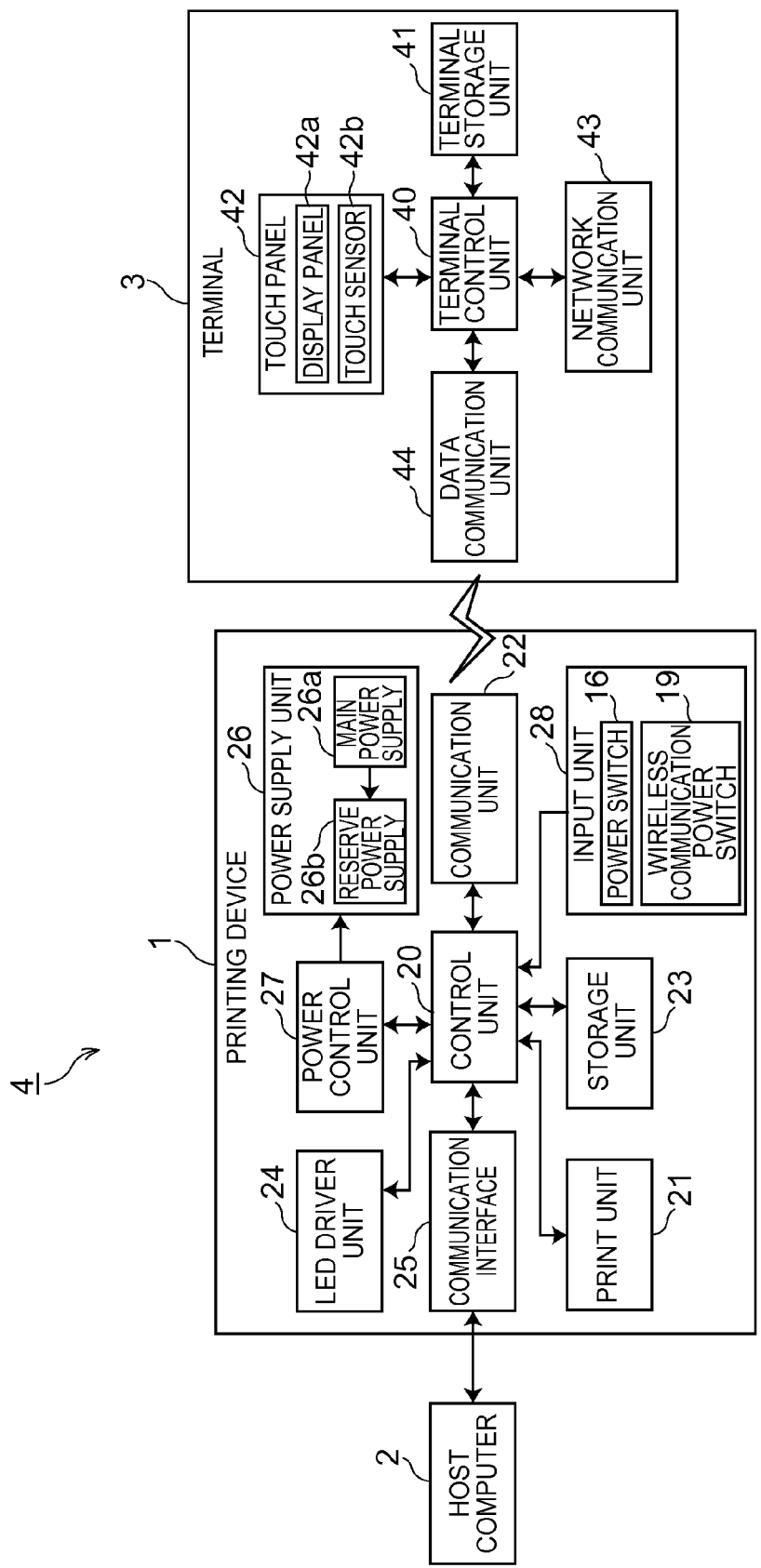
FIG. 2 is a block diagram illustrating the functional configuration of a printing system.

FIG. 2 is a block diagram showing the functional configuration of a printing system 4 according to this embodiment.

The printing system 4 includes a printing device 1 and a terminal 3.

As shown in FIG. 2, the printing device 1 includes a control unit 20, a print unit 21, a communication unit 22, a storage unit 23, an LED driver unit 24, a communication interface 25, a power supply unit 26, a power supply control unit 27, and an input unit 28.

The control unit 20 includes a CPU, ROM, RAM, and other peripheral circuits, and controls the printing device 1.

The print unit 21 includes a conveyance mechanism for conveying the roll paper 10; a print mechanism including a thermal head for forming dots on the roll paper 10; and a cutter mechanism for cutting the roll paper 10. The print unit 21 prints on the roll paper 10 as controlled by the control unit 20.

Based on receipt control data received from the host computer 2, the control unit 20 controls the print unit 21 and produces receipts printed with transaction information. The control unit 20 also controls the print unit 21 and produces coupons printed with coupon information based on coupon control data received from the host computer 2.

The communication unit 22 includes a radio antenna, and a signal processing circuit for encoding and modulating data transmitted by wireless communication. The communication unit 22 communicates wirelessly according to a specific communication protocol as controlled by the control unit 20. As described further below, the communication unit 22 sends the position correction signal S1 (identification information) by wireless communication as controlled by the control unit 20.

The storage unit 23 includes nonvolatile memory and stores data.

The LED driver unit 24 drives the LEDs 18 as controlled by the control unit 20.

The communication interface 25 communicates with the host computer 2 according to a specific communication protocol as controlled by the control unit 20. This specific communication protocol is, for example, a serial communication standard such as USB or RS232-C.

The power supply unit 26 includes a main power supply 26a and a reserve power supply 26b.

The main power supply 26a is connected to an outlet in the wall of the installation, for example, and receives power supplied from a commercial power source, and supplies power to other parts of the printing device 1.

The reserve power supply 26b includes a storage battery and a charger that charges the storage battery with power received from the main power supply 26a. The reserve power supply 26b supplies power stored in the battery to other parts of the printing device 1.

The power supply control unit 27 controls the power supply of the main power supply 26a and reserve power supply 26b as controlled by the control unit 20.

The input unit 28 detects operation of switches on the printing device 1, and outputs to the control unit 20. In addition to the power switch 16 and operating switch 17 described above, the printing device 1 also has a wireless communication power switch 19 (second switch). The wireless communication power switch 19 is disposed to the control board as a DIP switch, for example.

The power switch 16 is a switch that turns the supply of power from the power supply unit 26 to parts other than the communication unit 22 on or off. Therefore, when the power switch 16 is on, power is supplied from the power supply unit 26 to the print unit 21, for example, as controlled by the power supply control unit 27. When the power switch 16 is on, the printing device 1 can execute processes other than processes based on functions of the communication unit 22, including communicating with the host computer 2, printing with the print unit 21, and driving the LEDs 18 with the LED driver unit 24.

The wireless communication power switch 19 is a switch that turns the supply of power to the communication unit 22 on or off. Therefore, when the wireless communication power switch 19 is on, power is supplied to the communication unit 22 and related parts (such as the control unit 20) as controlled by the power supply control unit 27. When the wireless communication power switch 19 is on and the power switch 16 is on, the power supply control unit 27 supplies power from the main power supply 26a to the communication unit 22 and related parts. When the wireless communication power switch 19 is on and the power switch 16 is off, the power supply control unit 27 supplies power from the reserve power supply 26b to the communication unit 22 and related parts. When the wireless communication power switch 19 is on, therefore, power is supplied to the communication unit 22 and related parts (such as the control unit 20), and the communication unit 22 can transmit the position correction signal S1 by wireless communication.

The terminal 3 is a mobile terminal that the customer can easily carry, such as a cell phone, tablet computer, or notebook computer. The terminal 3 is not limited thereto, however, and may be any device that the customer can bring to the business. In this embodiment of the invention, the terminal 3 is a tablet-type cell phone (a smartphone) having a touch panel 42 on the face.

As shown in FIG. 2, the terminal 3 includes a terminal control unit 40, a terminal storage unit 41 (position information storage unit), a touch panel 42 (display unit), a network communication unit 43 (transceiver unit), and a data communication unit 44.

The terminal control unit 40 includes a CPU, ROM, RAM, and other peripheral circuits and controls the terminal 3.

The terminal storage unit 41 has nonvolatile memory, and stores data. The terminal storage unit 41 also stores a specific application AP. The function of this application AP is described further below.

The touch panel 42 includes a display panel 42a disposed to the front of the terminal 3, and a touch sensor 42b disposed over the display panel 42a. The display panel 42a is a display such as an LCD panel or OLED panel. The touch sensor 42b is a capacitive or pressure sensitive sensor, detects the operator's touch operations with a finger or stylus, and outputs to the terminal control unit 40.

The network communication unit 43 communicates through a LAN, telephone network, the Internet, or other network with other devices (such as a server) connected to the network as controlled by the terminal control unit 40.

The data communication unit 44 includes a radio antenna, and a signal processing circuit for decoding and demodulating data received by wireless communication. The data communication unit 44 communicates wirelessly according to a specific communication protocol as controlled by the terminal control unit 40. As described further below, the data communication unit 44 receives the position correction signal S1 (identification information) by wireless communication as controlled by the terminal control unit 40.

One method of using the printing device 1 is described below with reference to a specific example.

In this example the printing device 1 is installed in a shopping mall and deploys a position measurement system 5 in the mall. In this example, the shopping mall is a facility populated by multiple different businesses (stores).

Figure 3:
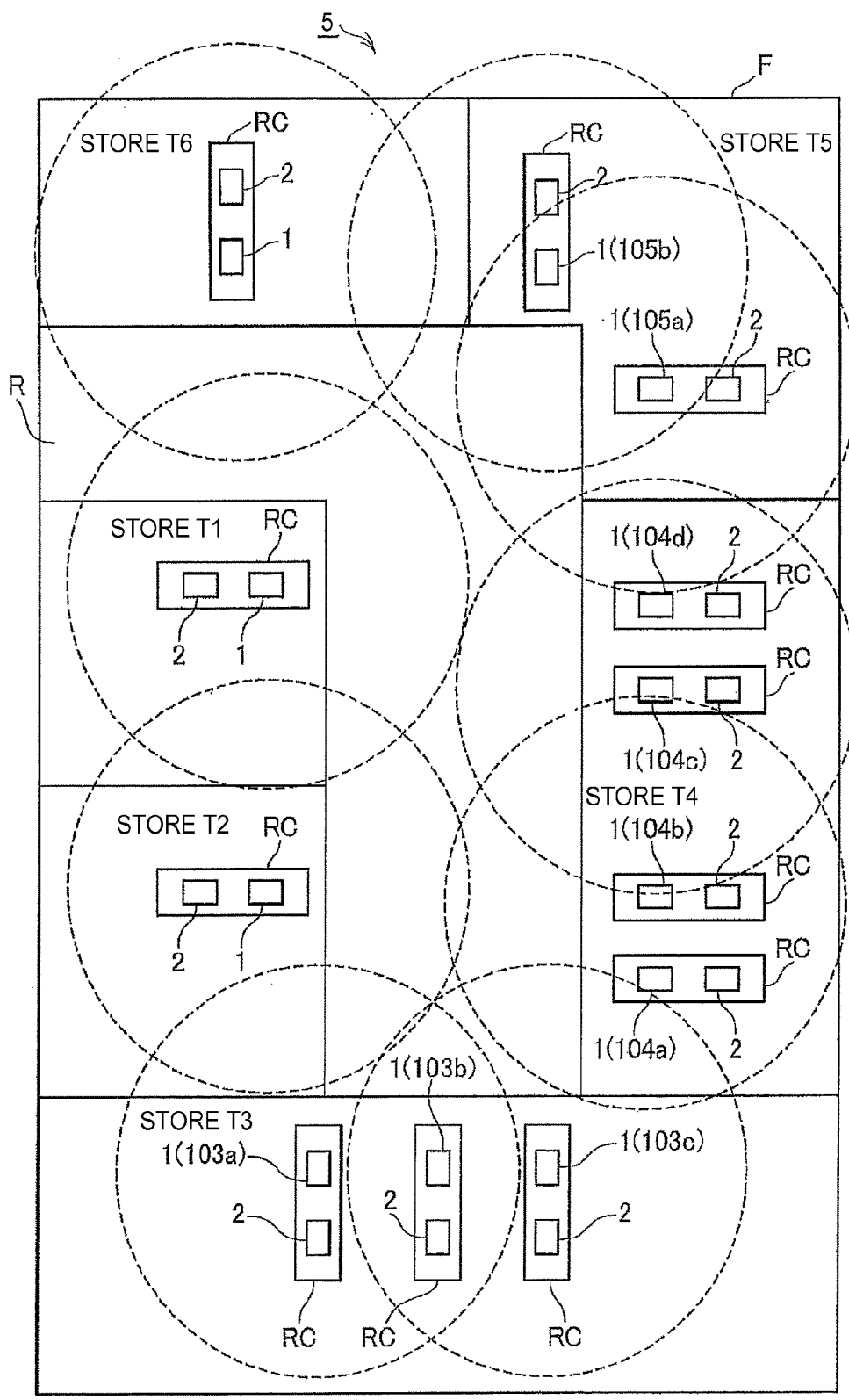
FIG. 3 illustrates a position measurement system assembled on a sales floor.

FIG. 3 illustrates an example of a floor F in the shopping mall where the position measurement system 5 is deployed by installing the printing devices 1.

As shown in FIG. 3, there are six stores T1 to T6 which customers may visit on the floor F through a hallway R. When not specifically differentiating between the stores T1 to T6, they are referred to below as store T.

Each store T has one or more checkout counters RC. In this example, stores T1, T2 and T6 each have one checkout counter RC. Store T5 has two checkout counters RC. Store T3 has three checkout counters RC. Store T4 has four checkout counters RC.

A printing device 1 and a host computer 2 that controls the printing device 1 are installed at each checkout counter RC.

The three printing devices 1 installed at the three checkout counters RC in store T3 are referred to individually below as printing device 103a, printing device 103b, and printing device 103c. The four printing devices 1 installed at the four checkout counters RC in store T4 are referred to individually below as printing device 104a, printing device 104b, printing device 104c, and printing device 104d. The two printing devices 1 installed at the two checkout counters RC in store T5 are referred to individually below as printing device 105a and printing device 105b.

As described above, the printing device 1 has a function for sending a position correction signal S1 by wireless communication. While the position correction signal S1 is described in detail below, the position correction signal S1 is a signal used for position information correction by the terminal 3. In FIG. 3, the reception range of the position correction signal S1 transmitted by a printing device 1 is indicated by a dotted circle centered on the printing device 1.

As described further below, the terminal 3 has a function for generating position information (more specifically "terminal position information" described below) indicating the position of the terminal 3, and a function for correcting the position information when triggered by receiving a position correction signal S1. For a terminal 3 brought onto the floor F to correct the position information with a high degree of accuracy, the area on the floor F reached by the position correction signal S1 must be as large as possible.

As shown in FIG. 3, the stores T are dispersed around the floor F, and a printing device 1 is installed at each of the one or plural checkout counters RC in the stores T. As a result, the area reached by the position correction signal S1 transmitted wirelessly by each printing device 1 on the floor F is a large, uniform area.

As described above, a position measurement system 5 is deployed in this embodiment of the invention by installing a printing device 1 with the ability to transmit a position correction signal S1 at each checkout counter RC. As a result, the cost of building a position measurement system 5 can be reduced, and the system can be simplified, when compared with building the position measurement system 5 by installing dedicated devices having the ability to transmit the position correction signal S1 on the floor F. More specifically, with this embodiment of the invention, there is no need to prepare specialized devices, no need for the space required to install specialized devices, and no need for the equipment (such as equipment for supplying power) used to install specialized devices. Simply installing a printing device 1 where the printing device 1 is to be installed at the checkout counter RC, for example, is sufficient. The cost of building the position measurement system 5 can therefore be reduced, and the system can be simplified.

Of the three printing devices 1 in store T3, printing device 103a and printing device 103c transmit the position correction signal S1 and printing device 103b does not transmit the position correction signal S1. In this configuration, the wireless communication power switches 19 of printing device 103a and printing device 103c are on, and the wireless communication power switch 19 of the printing device 103b is off. This is because the greater part of the area reached by the position correction signal S1 transmitted by the printing device 103b is covered by the area reached by the position correction signals S1 transmitted by printing device 103a and printing device 103c.

The printing devices 1 have a wireless communication power switch 19 separately from the power switch 16. This enables stopping the supply of power to the communication unit 22 and preventing the communication unit 22 from functioning. Therefore, when there is no need to transmit the position correction signal S1, sending the position correction signal S1 can be stopped while still enabling executing processes including printing, and power consumption can be reduced.

Similarly, of the four printing devices 1 in store T4, printing device 104*b* and printing device 104*c* transmit the position correction signal S1, and printing device 104*a* and printing device 104*d* do not output the position correction signal S1. In this configuration, the wireless communication power switch 19 is on in printing device 104*b* and printing device 104*c*, and the wireless communication power switch 19 is off in printing device 104*a* and printing device 104*d*.

Note that the means of stopping transmission of the position correction signal S1 by the communication unit 22 in this embodiment of the invention is stopping the supply of power to the communication unit 22, but configurations that stop the communication unit 22 from functioning by other means may be used. For example, the communication unit 22 can be stopped from executing the signal transmission process by stopping the related program from executing. In this event, the user commands stopping transmission of the position correction signal S1 by the communication unit 22 by some other specific means.

The state of the printing device 1 when turning the power switch 16 on and off is next.

Below, the wireless communication power switch 19 of the printing device 1 remains in the on position.

When the power switch 16 switches from on to off, the operating mode changes from mode M1 (first mode) to mode M2 (second mode). When the power switch 16 switches from off to on, the operating mode changes from mode M2 to mode M1.

Mode M1 is the operating mode in which power is supplied from the power supply unit 26 to the print unit 21 and communication unit 22. Mode M2 is the operating mode in which power is supplied from the power supply unit 26 to the communication unit 22.

When the power switch 16 is on and something can be printed by the print unit 21, the operating mode is set to mode M1, and the printing device 1 prints by the print unit 21 and sends the position correction signal S1 by the communication unit 22. When the power switch 16 is off and nothing is printed by the print unit 21, the operating mode is set to mode M2, the power supply to the print unit 21 is stopped, and the printing device 1 continues transmitting the position correction signal S1 by the communication unit 22.

In general, the power switch 16 of the printing device 1 is on during the normal business hours of the store, and the power switch 16 is off during non-business hours. The supply of power to the communication unit 22 continues and the communication unit 22 continues transmitting the position correction signal S1, even when the power switch 16 of the printing device 1 is off. As a result, regardless of the business hours of a store T on the floor F, the area reached by the position correction signals S1 on the floor F is a large, uniform area, and the position measurement system 5 can be kept in the state enabling a terminal 3 to accurately correct the position information.

When the power switch 16 is off, power supply to the print unit 21 stops, and power consumption is thereby suppressed.

The process whereby the printing device 1 transmits the position correction signal S1 is described next.

Figure 4:
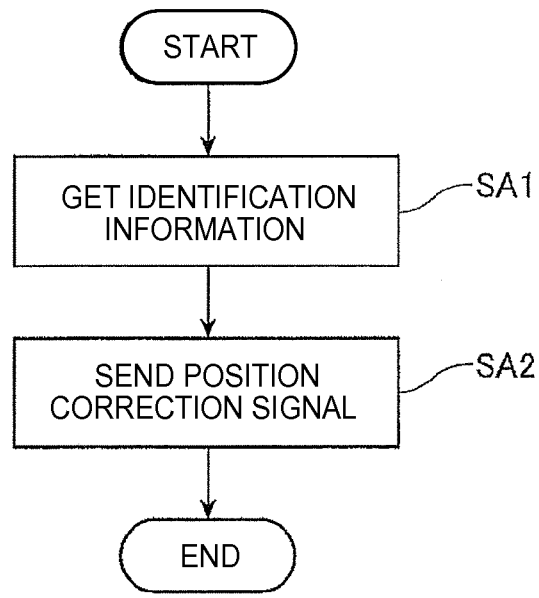
FIG. 4 is a flow chart illustrating the operation of the printing device.

FIG. 4 is a flow chart illustrating operation of the printing device 1 when sending the position correction signal S1.

The printing device 1 executes the process shown in the flow chart in FIG. 4 at a specific interval. For example, the printing device 1 may execute the process shown in the flow chart in FIG. 4 once a second.

As shown in FIG. 4, the control unit 20 of the printing device 1 references the identification information stored by the storage unit 23 and acquires the identification information (step SA1).

This identification information is information identifying a particular printing device 1, and is a different value for each printing device 1. The SSID or MAC address, for example, may be used as the identification information.

The control unit 20 then controls the communication unit 22 and causes the communication unit 22 to generate a position correction signal S1 containing the acquired identification information, and transmits the result as an RF signal (step SA2).

The printing device 1 thus broadcasts the position correction signal S1 at a specific interval.

Operation of a terminal 3 brought onto the floor F by a customer is described next.

Figure 5:
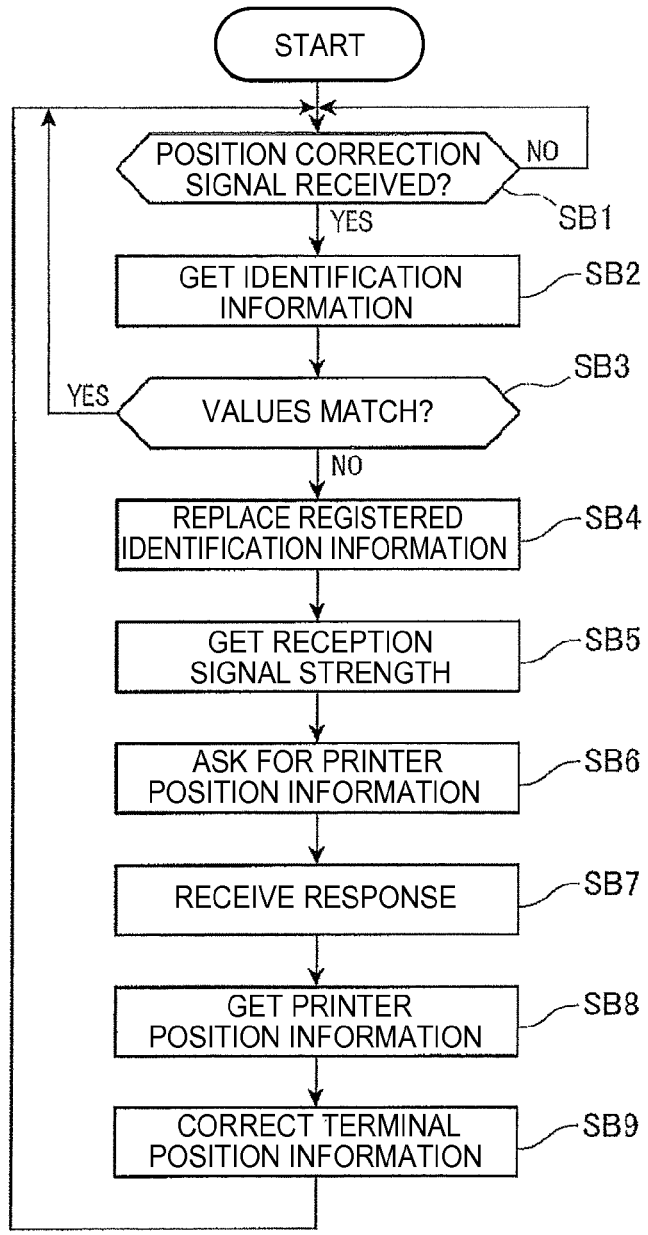
FIG. 5 is a flow chart illustrating the operation of a terminal.

FIG. 5 is a flow chart illustrating the operation of the terminal 3.

When the flow chart shown in FIG. 5 starts, the application AP previously installed on the terminal 3 is already running, and the terminal control unit 40 of the terminal 3 executes processes according to the application AP.

Note that the area the position correction signal S1 transmitted by a particular printing device 1 reaches is referred to below as the "signal reception range."

As shown in FIG. 5, the terminal control unit 40 determines if a position correction signal S1 was received by the data communication unit 44 (step SB1). This step repeats until a position correction signal S1 is received.

Note that there are situations in which a terminal 3 is located where plural different signal reception ranges overlap. As a result, when position correction signals S1 with different identification information are received within a specific time, the terminal control unit 40 executes an appropriate process such as reading the signals with the greatest signal strength.

When a position correction signal S1 is received (step SB1 returns YES), the terminal control unit 40 extracts the identification information contained in the received position correction signal S1 (step SB2).

Next, the terminal control unit 40 determines if the value of the identification information acquired in step SB2 and the value of the identification information indicated by the registered identification information the terminal storage unit 41 stores are the same. (step SB3).

The registered identification information is information as described below.

When the terminal 3 is located within the signal reception range of the position correction signal S1 from a single printing device 1, the terminal 3 receives a position correction signal S1 containing identification information of a single value from the single printing device 1.

If the location of the terminal 3 is outside the signal reception range of the single position correction signal S1, and is in the signal reception range of a position correction signal S1 from another printing device 1, the terminal 3 receives the position correction signal S1 containing the identification information of the other value from the other printing device 1.

As the signal reception range associated with the position of the terminal 3 changes, the value of the identification information contained in the position correction signal S1 the terminal 3 receives therefore also changes.

The registered identification information is thus information that is overwritten to express the value of the new identification information when the value of the identification information contained in the received position correction signal S1 changes. If the signal reception range in which the terminal 3 is located changed is therefore determined in step SB3.

If the values match in step SB3 (step SB3 returns YES), the terminal control unit 40 returns to step SB1. If the values do not match in step SB3 (step SB3 returns NO), the terminal control unit 40 replaces the registered identification information stored in the terminal storage unit 41 with the identification information acquired in step SB2 (step SB4).

Next, the terminal control unit 40 gets the reception signal strength of the position correction signal S1 received by the data communication unit 44 (step SB5).

Next, the terminal control unit 40 controls the network communication unit 43 to send a printer position information request including the identification information acquired in step SB2 to a specific server and ask for the printer position information (step SB6). This printer position information is information indicating the position of the printing device 1 (such as information indicating the latitude and longitude of the position of the printing device 1). The data format of the printer position information request, the address of the server that sends the printer position information, and the protocol used for communication with the server, are predetermined.

The server relationally stores the identification information of the printing device 1 and the printer position information indicating the position of the printing device 1, in the server storage unit. The printer position information is overwritten appropriately according to the current position of the printing device 1 by a specific means to indicate the position of the printing device 1.

When the server receives the printer position information request sent by the terminal 3 in step SB6, it accesses the server storage unit and acquires the printer position information related to the identification information by using the identification information contained in the request as the search key.

Next, the server sends the response data including the acquired printer position information to the terminal 3.

The terminal control unit 40 receives the response data sent by the server (step SB7).

Next, the terminal control unit 40 acquires the printer position information contained in the received response data (step SB8).

Next, the terminal control unit 40 corrects the terminal position information stored by the terminal storage unit 41 based on the reception signal strength acquired in step SB5 and the printer position information acquired in step SB8 (step SB9).

The application AP has a function for displaying a floor map of the floor F on the display panel 42a of the terminal 3, and showing the position of the terminal 3 on the displayed floor map. The application AP also has a function for storing terminal position information indicating the position of the terminal 3 in the terminal storage unit 41.

The terminal control unit 40 displays the floor map on the display panel 42a, and displays the position of the terminal 3 on the floor map based on the terminal position information stored by the terminal storage unit 41, based on the application AP. In step SB9, the terminal position information stored by the terminal storage unit 41 is corrected.

Correcting the terminal position information is done by the following method, for example.

Knowing that the reception signal strength decreases as the distance of the terminal 3 from the printing device 1 increases, the terminal control unit 40 estimates the distance between the printing device 1 and terminal 3. Next, the terminal control unit 40 calculates the direction of the position of the terminal 3 from the position of the printing device 1 based on the change in the position of the terminal 3. If the terminal 3 has a GPS function, the GPS function of the terminal 3 may be used to detect the direction of travel. Next, the terminal control unit 40 calculates the position of the terminal 3 based on the position of the printing device 1 indicated by the printer position information and the estimated distance and direction of travel, and corrects the terminal position information indicated by the terminal position information stored by the terminal storage unit 41 to information indicating the calculated position of the terminal 3.

The terminal control unit 40 then returns to step SB1 after correcting the terminal position information.

As described above, the terminal 3 corrects the terminal position information based on the received position correction signal S1. Therefore, for a terminal 3 brought onto the floor F to correct the terminal position information with a high degree of accuracy, the position measurement system 5 must minimize the chances of the terminal 3 not being in any signal reception range, and the associated signal reception range must change appropriately according to the movement of the customer carrying the terminal 3. As described above, because the printing device 1 disposed at the checkout counter RC has a function for broadcasting the position correction signal S1 in this embodiment of the invention, the cost of building the system can be reduced, the system can be simplified, and the position measurement system 5 described above can be deployed.

The terminal position information may be used to provide services such as displaying a floor map of the floor F on the display panel 42a of the terminal 3, and indicating the current position of the customer on the displayed floor map.

As described above, the printing device 1 according to this embodiment of the invention has a print unit 21 that prints, a storage unit 23 that stores identification information, and a communication unit 22 that broadcasts a position correction signal S1 containing the identification information stored in the storage unit 23.

Thus comprised, the printing device 1 has a function for sending by wireless communication a position correction signal S1 containing identification information used for position correction by the terminal 3. A system (a position measurement system 5) enabling position correction by the terminal 3 can thus be built, and the terminal 3 can receive the position correction signal S1 sent by wireless communication by the printing device 1 and correct its position using the position correction signal S1, without needing to install specialized devices that communicate with the terminal 3 on a wall, or needing to install new equipment for operating the specialized devices, by simply installing a printing device 1 wherever a printing device 1 is used. The cost of constructing a system enabling position correction by the terminal 3 can therefore be reduced, and the system can be simplified.

A printing device 1 according to this embodiment of the invention has a power supply unit 26 that supplies power to a print unit 21 and a communication unit 22; and a power switch 16 (switching unit) that sets the operating mode of the printing device 1 to a mode M1 (first mode) that supplies power to the print unit 21 and the communication unit 22, or a mode M2 (second mode) that supplies power to the communication unit 22.

Thus comprised, power consumption by the printing device 1 can be reduced by changing the operating mode of the printing device 1 to mode M2 when the print unit 21 is not used to stop the supply of power to the print unit 21.

The printing device 1 according to this embodiment changes from mode M1 to mode M2 when the power switch 16 switches from on to off.

Thus comprised, when the power switch 16 is off and the print unit 21 is not used for printing, the operating mode of the printing device 1 changes from mode M1 to mode M2, thereby stopping the supply of power to the print unit 21 while continuing transmission of the position correction signal S1 by the communication unit 22.

The printing device 1 according to this embodiment also has a power switch 16 (first switch) that turns the supply of power to the print unit 21 on and off, and a wireless communication power switch 19 (second switch) that turns the supply of power to the communication unit 22 on and off.

Because the printing device 1 thus comprised has a wireless communication power switch 19 that turns the supply of power to the communication unit 22 on and off separately from the power switch 16 that turns the supply of power to the print unit 21 on and off, users that do not want the communication unit 22 to broadcast the position correction signal S1 can operate the wireless communication power switch 19 to turn the supply of power to the communication unit 22 off so that the position correction signal S1 is not transmitted.

The control unit 20 of the printing device 1 according to this embodiment controls the print unit 21 to produce receipts printed with transaction information.

Thus comprised, a system that enables position correction by the terminal 3 can be deployed by simply installing a printing device 1 where customer transactions are processed, such as at a checkout counter in a store.

The control unit 20 of the printing device 1 according to this embodiment also controls the print unit 21 to produce coupons printed with coupon information.

Thus comprised, a system that enables position correction by the terminal 3 can be deployed by simply installing a printing device 1 where coupons are given to customers, such as at a checkout counter in a store.

The printing system 4 according to this embodiment of the invention has a printing device 1; and a terminal 3 including a data communication unit 44 that receives the position correction signal S1 by wireless communication, and a terminal control unit 40 that generates terminal position information indicating the position of the terminal 3, and corrects the terminal position information based on the identification information contained in the position correction signal S1 when the data communication unit 44 receives a position correction signal S1.

Thus comprised, the cost of deploying a system enabling position correction by the terminal 3 can be reduced, and the system can be simplified.

Variation of Embodiment 1

A variation of the first embodiment is described next.

Note that elements that are the same in this variation as in the first embodiment described above are identified by like reference numerals, and further description thereof is described below.

Figure 6:
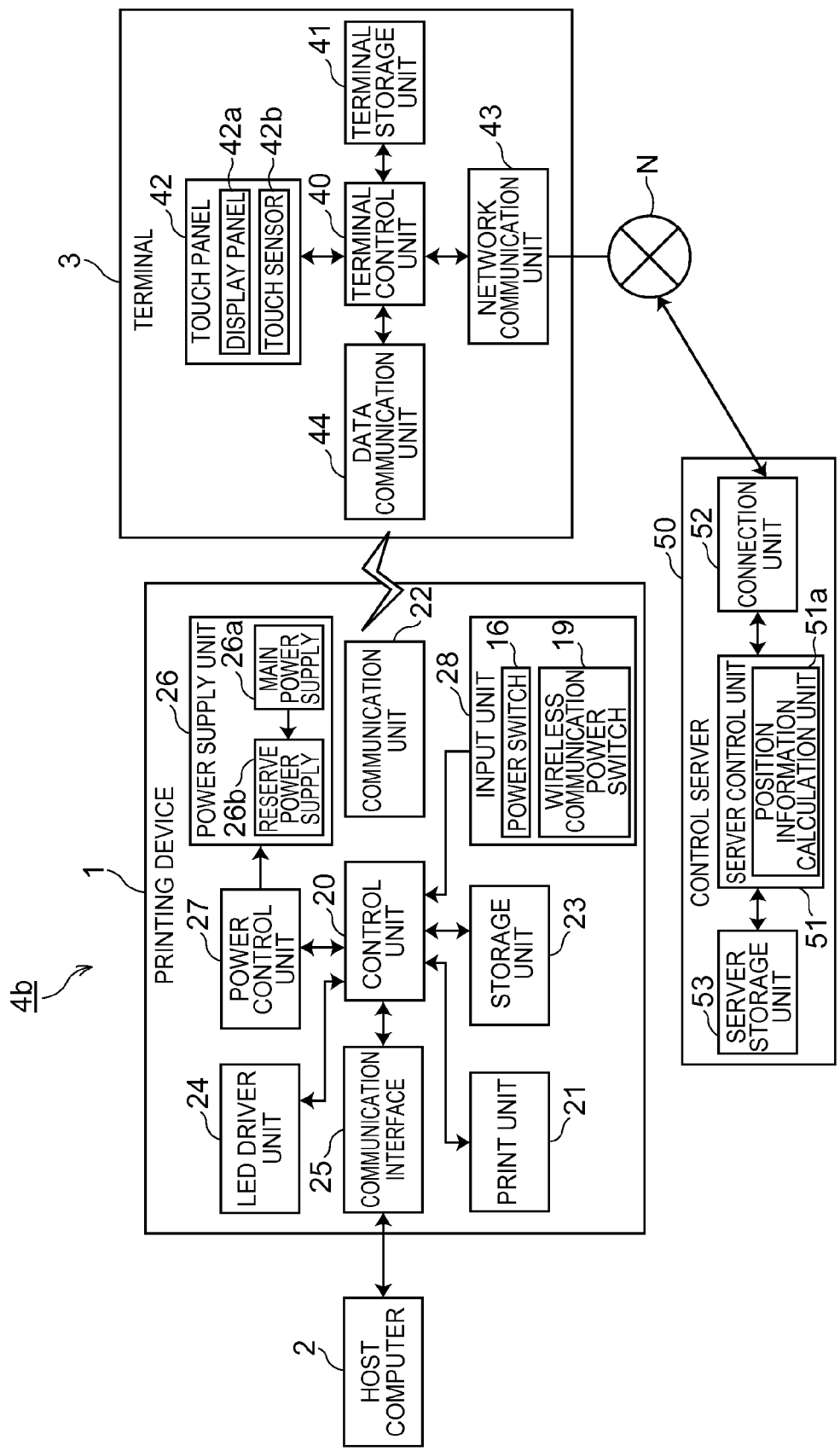
FIG. 6 is a block diagram illustrating the functional configuration of a printing system according to a variation of the first embodiment.

FIG. 6 is a block diagram illustrating the functional configuration of a printing system according to a variation of the first embodiment.

As shown in FIG. 6, the printing system 4b according to this embodiment also has a control server 50 (management device) that connects to the terminal 3 through a network N such as the Internet.

The control server 50 has a server control unit 51, a connection unit 52 (reception unit, transmission unit), and a server storage unit 53.

The server control unit 51 includes a CPU and controls the control server 50. The server control unit 51 has a position information calculation unit 51a. The position information calculation unit 51a is described further below.

The connection unit 52 communicates according to a specific communication protocol with the terminal 3 through the network N as controlled by the server control unit 51.

The server storage unit 53 stores data.

When the terminal 3 receives the position correction signal S1 in the first embodiment described above, the terminal control unit 40 corrects the terminal position information indicating the position of the terminal 3. In this variation of the first embodiment, the control server 50 generates the terminal position information.

More specifically, when the terminal 3 receives a specific position correction signal S1, the terminal control unit 40 executes the following process. The terminal control unit 40 gets the reception signal strength of the received position correction signal S1, and then controls the network communication unit 43 to send the identification information contained in the signal and information indicating the reception signal strength through the network N to the control server 50.

The position information calculation unit 51a of the server control unit 51 of the control server 50 then generates the terminal position information indicating the position of the terminal 3 using the same method described as the process of the terminal 3 in the first embodiment based on the received identification information and the reception signal strength information. Note that the method of generating the terminal position information is not limited to the method described above. The information used by the control server 50 to generate the terminal position information is also transmitted from the terminal 3 to the control server 50.

The position information calculation unit 51a then controls the connection unit 52 and sends the generated terminal position information through the network N to the terminal 3.

The terminal control unit 40 of the terminal 3 controls the network communication unit 43 to receive the terminal position information. Next, the terminal control unit 40 stores the received terminal position information in the terminal storage unit 41. Next, the terminal control unit 40 displays the location of the terminal 3 on the floor map displayed on the display panel 42a based on the received terminal position information.

As described above, a configuration in which the terminal 3 sends specific information to the control server 50 when the position correction signal S1 is received by the terminal 3, and control server 50 generates the terminal position information based on the specific information, is also conceivable. This configuration has the same effect as the effect of the first embodiment described above.

The invention is described above with reference to a preferred embodiment thereof, but the invention is not limited thereto and can be modified and adapted in many ways without departing from the scope of the accompanying claims.

For example, in the above first embodiment, the terminal 3 corrects the terminal position information when the terminal 3 moves into a different signal reception range. The timing for correcting the terminal position information is not limited to this example, however. For example, the terminal position information may be corrected when a specific time has passed, corrected when the terminal 3 has a means of detecting the distance traveled and the distance traveled equals or exceeds a specific distance, corrected with a specific condition is met, or corrected when commanded by the customer (user).

The specific position correction method of the terminal 3 is also not limited to the example described above. Any method that uses a signal received from the printing device 1 may be used for position correction.

Embodiment 2

A second embodiment of the invention is described next.

Figure 7:
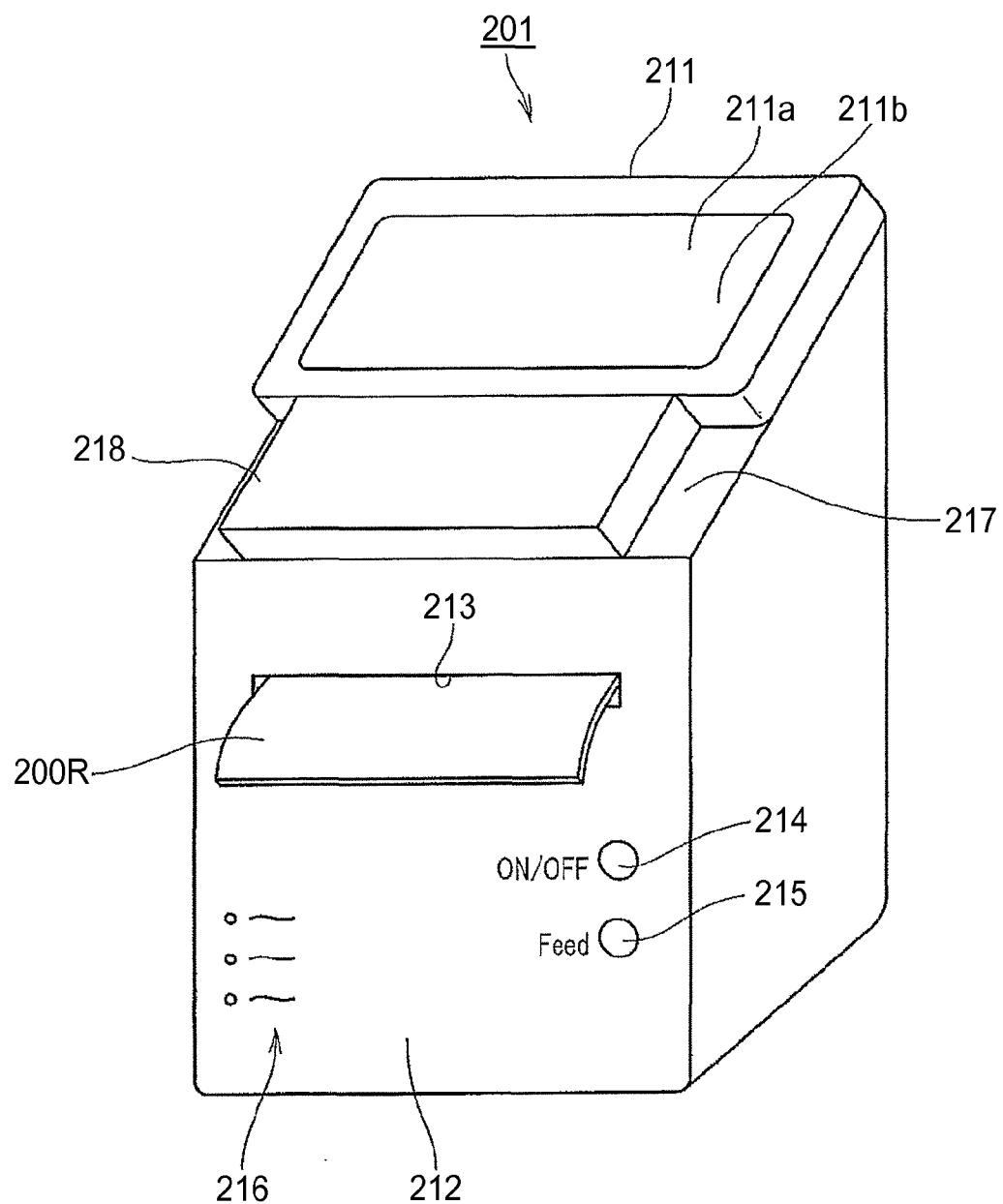
FIG. 7 is an oblique view of a reading device according to a second embodiment of the invention.

FIG. 7 is an oblique view of a reading device 201 according to a second embodiment of the invention.

The reading device 201 is a device with functions for reading information from an IC card, printing on roll paper 200R and producing coupons, displaying information, and receiving input of information by touch operations.

As shown in FIG. 7, the reading device 201 houses a control board and the mechanisms of a print unit 221 described below inside the case. The reading device 201 also stores roll paper 200R in a roll inside the case.

A paper exit 213 from which the roll paper 200R is discharged is formed in the top of the front 212 of the reading device 201. A power switch 214 that turns the power of the reading device 201 on and off is disposed on the right side below the paper exit 213. A paper feed switch 215 for automatically feeding the roll paper 200R is disposed below the power switch 214. To the left of the paper feed switch 215 is a group of LEDs 216 for indicating the status of the reading device 201, including the operating mode and whether or not an error has occurred.

A reading panel 218 is disposed above the top 217 of the reading device 201. The antenna of an IC card reader 229 described further below is disposed at a position appropriate to the reading panel 218. To read information recorded on the IC card with the reading device 201, the user holds the IC card in proximity to the reading panel 218.

A touch panel 211 is also disposed behind the reading panel 218 above the top 217 of the reading device 201. The touch panel 211 includes a display panel 211a that displays information, and a touch sensor 211b that detects touch operations.

One method of using the reading device 201 is described below with reference to a specific example.

In this example the reading device 201 is installed at the entrances to multiple stores in a shopping mall. In this example, the shopping mall is a facility populated by multiple different businesses (stores). Customers may have a membership card, which in this embodiment is a contactless IC card, and when visiting a store swipes the membership card over the reading device 201 at the entrance to the store to be read. The reading device 201 may issue a coupon to the customer based on the result of reading the membership card as described further below. Based on result of reading the membership card, the reading device 201 may also display information based on the customer on the touch panel 211.

Figure 8:
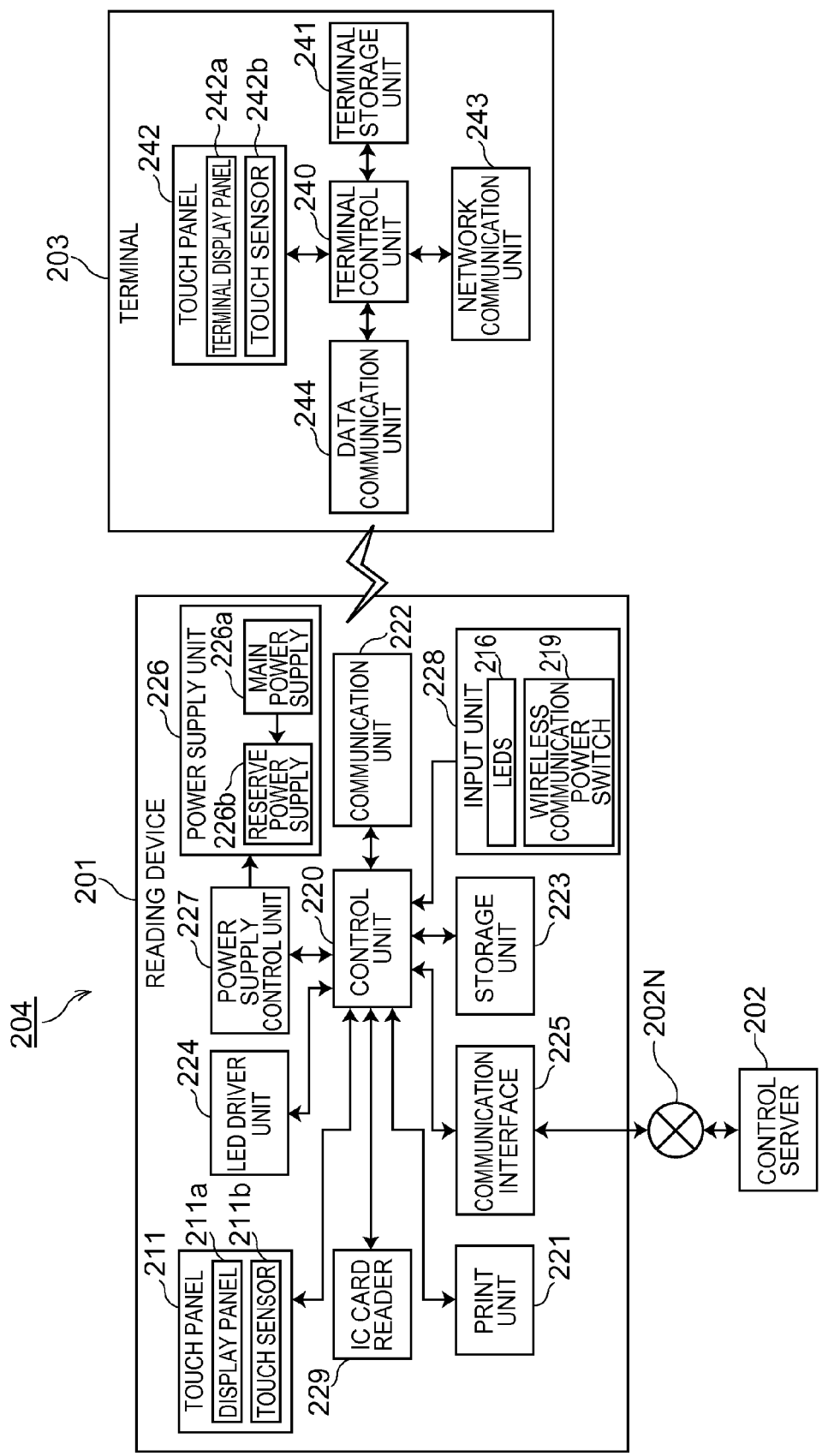
FIG. 8 is a block diagram illustrating the functional configuration of a reading system.

FIG. 8 is a block diagram showing the functional configuration of the reading system 204 according to this embodiment.

The reading system 204 includes a reading device 201 and a terminal 203.

As shown in FIG. 8, the reading device 201 includes a control unit 220, a touch panel 211, a print unit 221, a communication unit 222, a storage unit 223, an LED driver unit 224, a communication interface 225, a power supply unit 226, a power supply control unit 227, an input unit 228, and an IC card reader 229 (reading unit).

The control unit 220 includes a CPU, ROM, RAM, and other peripheral circuits, and controls the reading device 201.

The touch panel 211 includes a display panel 211a and a touch sensor 211b. The display panel 211a is a display such as an LCD panel or OLED panel, and displays information as controlled by the control unit 220. The touch sensor 211b is a capacitive or pressure sensitive sensor, detects the operator's touch operations with a finger or stylus, and outputs to the control unit 220.

The print unit 221 includes a conveyance mechanism for conveying the roll paper 200R; a print mechanism including a printhead (a thermal head in this example) for forming dots on the roll paper 200R; and a cutter mechanism for cutting the roll paper 200R. The print unit 221 prints on the roll paper 200R as controlled by the control unit 220.

The communication unit 222 includes a radio antenna, and a signal processing circuit for encoding and modulating data transmitted by wireless communication. The communication unit 222 communicates wirelessly according to a specific communication protocol as controlled by the control unit 220. As described further below, the communication unit 222 transmits the position correction signal S201 (identification information) by wireless communication as controlled by the control unit 220.

The storage unit 223 includes nonvolatile memory and stores data.

The LED driver unit 224 drives the LEDs 216 as controlled by the control unit 220.

The communication interface 225 communicates with the control server 202 through the network 200N according to a specific communication protocol as controlled by the control unit 220. The data communicated with the control server 202 is described further below.

The power supply unit 226 includes a main power supply 226a and a reserve power supply 226b.

The main power supply 226a is connected to an outlet in the wall of the installation, for example, and receives power supplied from a commercial power source, and supplies power to other parts of the reading device 201.

The reserve power supply 226b includes a storage battery and a charger that charges the storage battery with power received from the main power supply 226a. The reserve power supply 226b supplies power stored in the battery to other parts of the reading device 201.

The power supply control unit 227 controls the power supply of the main power supply 226a and reserve power supply 226b as controlled by the control unit 220.

The input unit 228 detects operation of switches disposed to the reading device 201, and outputs to the control unit 220. In addition to the power switch 214 and paper feed switch 215 described above, the reading device 201 also has a wireless communication power switch 219 (second switch). The wireless communication power switch 219 is disposed to the control board as a DIP switch, for example.

The power switch 214 is a switch that turns the supply of power from the power supply unit 226 to parts other than the communication unit 222 on or off. Therefore, when the power switch 214 is on, power is supplied from the power supply unit 226 to the print unit 221, for example, as controlled by the power supply control unit 227. When the power switch 214 is on, the reading device 201 can execute processes other than processes based on functions of the communication unit 222, including communicating with the control server 202, printing with the print unit 221, and driving the LEDs 216 with the LED driver unit 224.

The wireless communication power switch 219 is a switch that turns the supply of power to the communication unit 222 on or off. Therefore, when the wireless communication power switch 219 is on, power is supplied to the communication unit 222 and related parts (such as the control unit 220) as controlled by the power supply control unit 227. When the wireless communication power switch 219 is on and the power switch 214 is on, the power supply control unit 227 supplies power from the main power supply 226a to the communication unit 222 and related parts. When the wireless communication power switch 219 is on and the power switch 214 is off, the power supply control unit 227 supplies power from the reserve power supply 226b to the communication unit 222 and related parts. When the wireless communication power switch 219 is on, therefore, power is supplied to the communication unit 222 and related parts (such as the control unit 220), and the communication unit 222 can transmit the position correction signal S201 by wireless communication.

The IC card reader 229 (reading unit) is a mechanism for reading contactless IC cards, communicates by near-field communication according to a specific communication protocol with the IC card, and read information from the IC card.

The terminal 203 is a mobile terminal that the customer can easily carry, such as a cell phone, tablet computer, or notebook computer. The terminal 203 is not limited thereto, however, and may be any device that the customer can bring to the business. In this embodiment of the invention, the terminal 203 is a tablet-type cell phone (a smartphone) having a touch panel 242 on the face.

As shown in FIG. 8, the terminal 203 includes a terminal control unit 240, a terminal storage unit 241, a terminal touch panel 242, a network communication unit 243, and a data communication unit 244.

The terminal control unit 240 includes a CPU, ROM, RAM, and other peripheral circuits and controls the terminal 203.

The terminal storage unit 241 has nonvolatile memory, and stores data. The terminal storage unit 241 also stores a specific application 200AP. The function of this application 200AP is described further below.

The terminal touch panel 242 includes a terminal display panel 242a disposed to the front of the terminal 203, and a terminal touch sensor 242b disposed over the terminal display panel 242a.

The network communication unit 243 communicates through a LAN, telephone network, the Internet, or other network with other devices (such as a server) connected to the network as controlled by the terminal control unit 240.

The data communication unit 244 includes a radio antenna, and a signal processing circuit for decoding and demodulating data received by wireless communication. The data communication unit 244 communicates wirelessly according to a specific communication protocol as controlled by the terminal control unit 240. As described further below, the data communication unit 244 receives the position correction signal S201 (identification information) by wireless communication as controlled by the terminal control unit 240.

One method of using the reading device 201 is described below with reference to a specific example.

In this example the reading device 201 is installed in a shopping mall and deploys a position measurement system 205.

Figure 9:
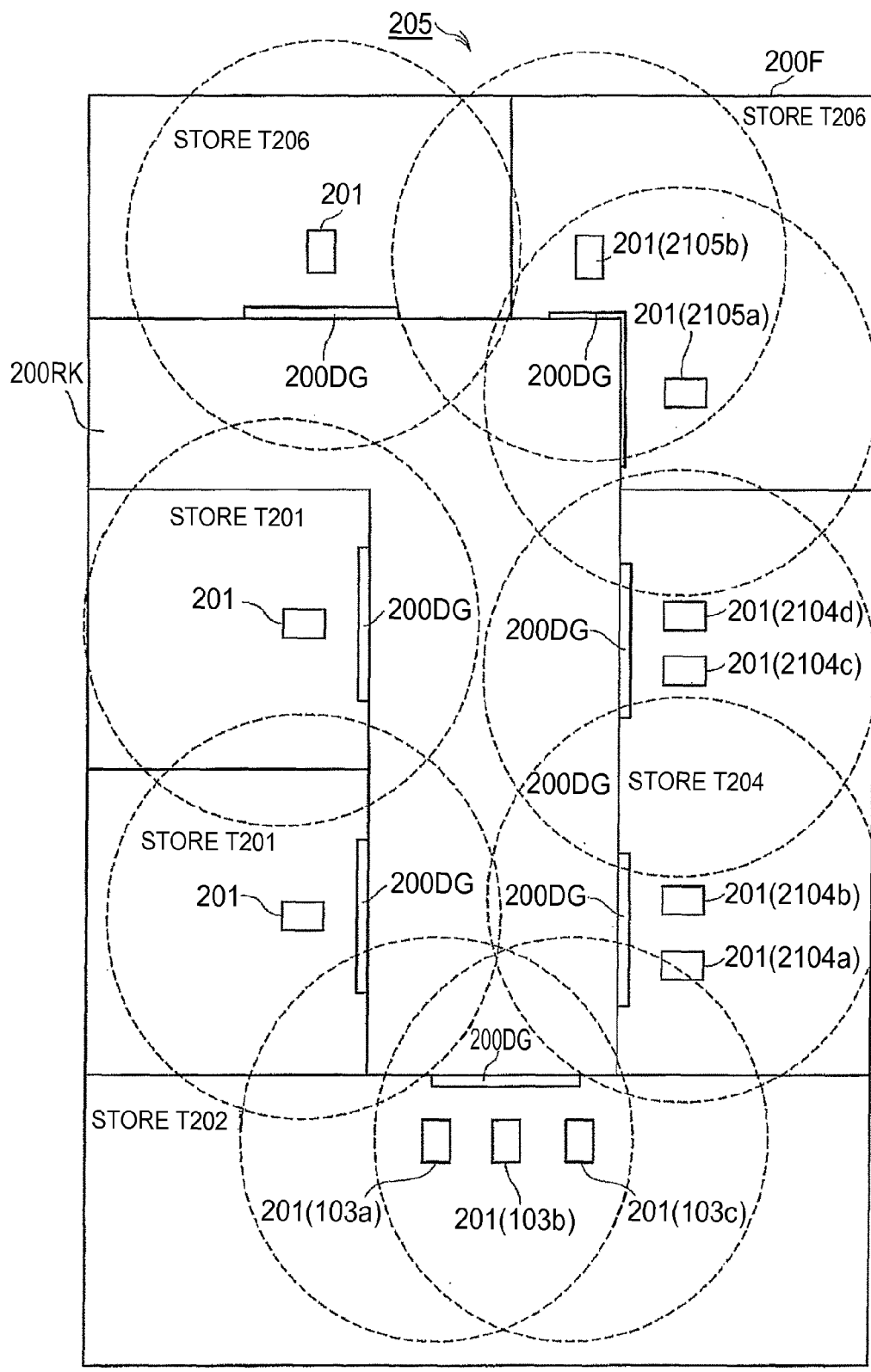
FIG. 9 illustrates a position measurement system assembled on a sales floor.

FIG. 9 illustrates an example of a floor 200F in the shopping mall where the position measurement system 205 is deployed by installing the reading devices 201.

As shown in FIG. 9, there are six stores T201 to T206 which customers may visit on the floor 200F through a hallway 200RK. When not specifically differentiating between the stores T201 to T206, they are referred to below as stores T200.

Each store T200 has one or more entrances 200DG. One or more reading devices 201 are installed at a position appropriate to the entrances 200DG of the store T200. For example, the reading device 201 may be placed on a specific stand at a position appropriate to the entrance 200DG.

In this example, stores T201, T202 and T206 each have one reading device 201 installed at a position appropriate to the entrance 200DG. Store T205 has two reading devices 201 installed at the entrance 200DG. Store T203 has three reading device 201 installed at a position appropriate to the entrance 200DG. Store T204 has four reading devices 201 installed at positions appropriate to the entrances 200DG.

The three reading devices 201 installed in store T203 are referred to individually below as reading device 2103a, reading device 2103b, and reading device 2103c. The four reading devices 201 installed in store T204 are referred to individually below as reading device 2104a, reading device 2104b, reading device 2104c, and reading device 2104d. The two reading devices 201 in store T205 are referred to individually below as reading device 2105a and reading device 2105b.

As described above, the reading device 201 has a function for sending a position correction signal S201 by wireless communication. While the position correction signal S201 is described in detail below, the position correction signal S201 is a signal used for position information correction by the terminal 203. In FIG. 9, the reception range of the position correction signal S201 transmitted by a reading device 201 is indicated by a dotted circle centered on the reading device 201.

As described further below, the terminal 203 has a function for generating position information (more specifically "terminal position information" described below) indicating the position of the terminal 203, and a function for correcting the position information when triggered by receiving a position correction signal S201. For a terminal 203 brought onto the floor 200F to correct the position information with a high degree of accuracy, the area on the floor 200F reached by the position correction signal S201 must be as large as possible.

As shown in FIG. 9, the stores T200 are dispersed around the floor 200F, and one or more reading devices 201 are installed in the stores T200. As a result, the area reached by the position correction signal S201 transmitted wirelessly by each reading device 201 on the floor 200F is a large, uniform area.

As described above, a position measurement system 205 is deployed in this embodiment of the invention by installing a reading device 201 with the ability to transmit a position correction signal S201 in each store T200. As a result, the cost of deploying a position measurement system 205 can be reduced, and the system can be simplified, when compared with building the position measurement system 205 by installing dedicated devices having the ability to transmit a position correction signal S201 on the floor 200F. More specifically, with this embodiment of the invention, there is no need to prepare specialized devices, no need for the space required to install specialized devices, and no need for the equipment (such as equipment for supplying power) used to install specialized devices. Simply installing a reading device 201 where the reading device 201 is to be installed, such as at the entrance 200DG of the store T200, for example, is sufficient. The cost of building the position measurement system 205 can therefore be reduced, and the system can be simplified.

Of the three reading devices 201 in store T203, reading device 2103a and reading device 2103c transmit the position correction signal S201 and reading device 2103b does not transmit the position correction signal S201. In this configuration, the wireless communication power switches 219 of reading device 2103a and reading device 2103c are on, and the wireless communication power switch 219 of the reading device 2103b is off. This is because the greater part of the area reached by the position correction signal S201 transmitted by the reading device 2103b is covered by the area reached by the position correction signals S201 transmitted by reading device 2103a and reading device 2103c.

The reading devices 201 have a wireless communication power switch 219 separately from the main power switch 214. This enables stopping the supply of power to the communication unit 222 and preventing the communication unit 222 from functioning. Therefore, when there is no need to transmit the position correction signal S201, sending the position correction signal S201 can be stopped while still enabling executing processes including printing, and power consumption can be reduced.

Similarly, of the four reading devices 201 in store T204, reading device 2104b and reading device 2104c transmit the position correction signal S201, and reading device 2104a and reading device 2104d do not output the position correction signal S201. In this configuration, the wireless communication power switch 219 is on in reading device 2104b and reading device 2104c, and the wireless communication power switch 219 is off in reading device 2104a and reading device 2104d.

Note that the means of stopping transmission of the position correction signal S201 by the communication unit 222 in this embodiment of the invention is stopping the supply of power to the communication unit 222, but configurations that stop the communication unit 222 from functioning by other means may be used. For example, the communication unit 222 can be stopped from executing the signal transmission process by stopping the related program from executing. In this event, the user commands stopping transmission of the position correction signal S201 by the communication unit 222 by some other specific means.

The process whereby the reading device 201 transmits the position correction signal S201 is described next.

Figure 10:
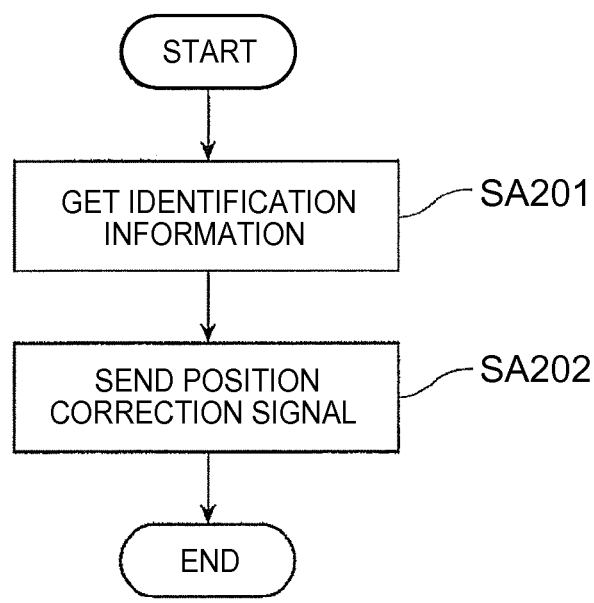
FIG. 10 is a flow chart illustrating the operation of the reading device.

FIG. 10 is a flow chart illustrating operation of the reading device 201 when sending the position correction signal S201.

The reading device 201 executes the process shown in the flow chart in FIG. 10 at a specific interval. For example, the reading device 201 may execute the process shown in the flow chart in FIG. 10 once a second.

As shown in FIG. 10, the control unit 220 of the reading device 201 references the identification information data stored by the storage unit 223 and acquires the identification information (step SA201).

This identification information is data indicating the identification information. The identification information is information identifying a particular reading device 201, and is a different value for each reading device 201. The SSID or MAC address, for example, may be used as the identification information.

The control unit 220 then controls the communication unit 222 and causes the communication unit 222 to generate a position correction signal S201 containing the acquired identification information, and transmits the result as an RF signal (step SA202).

The reading device 201 thus broadcasts the position correction signal S201 at a specific interval.

Operation of a terminal 203 brought onto the floor 200F by a customer is described next.

Figure 11:
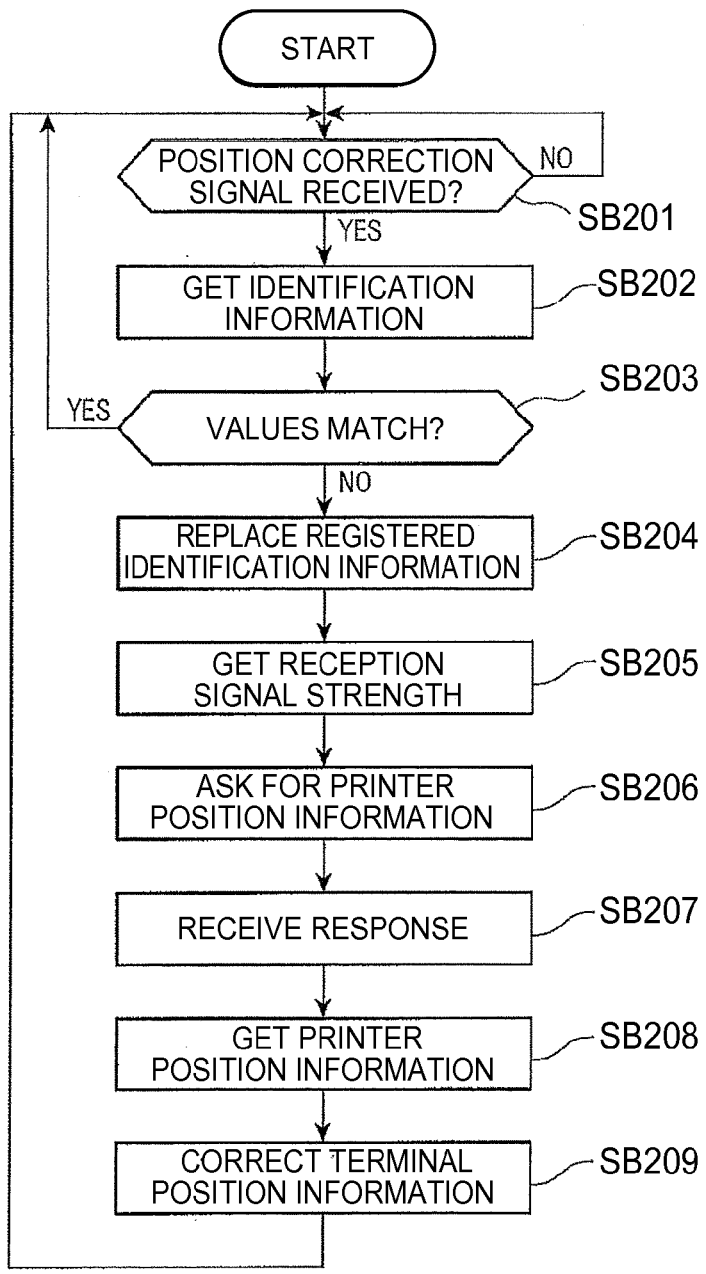
FIG. 11 is a flow chart illustrating the operation of a terminal.

FIG. 11 is a flow chart illustrating the operation of the terminal 203.

When the flow chart shown in FIG. 11 starts, the application 200AP previously installed on the terminal 203 is already running, and the terminal control unit 240 of the terminal 203 executes processes based on the functions of programs including the application 200AP.

Note that the area the position correction signal S201 transmitted by a particular reading device 201 reaches is referred to below as the "signal reception range."

As shown in FIG. 11, the terminal control unit 240 determines if a position correction signal S201 was received by the data communication unit 244 (step SB201). The terminal control unit 240 repeats this step until a position correction signal S201 is received.

Note that there are situations in which a terminal 203 is located where plural different signal reception ranges overlap. As a result, when position correction signals S201 with different identification information are received within a specific time, the terminal control unit 240 executes an appropriate process such as discarding the signal with the weaker signal strength.

When a position correction signal S201 is received (step SB201 returns YES), the terminal control unit 240 extracts the identification information contained in the received position correction signal S201 (step SB202).

Next, the terminal control unit 240 determines if the value of the identification information acquired in step SB202 and the value of the identification information indicated by the registered identification information data the terminal storage unit 241 stores are the same. (step SB203).

The registered identification information data is information as described below.

When the terminal 203 is located within the signal reception range of the position correction signal S201 from a single reading device 201, the terminal 203 receives a position correction signal S201 containing identification information of a single value from the single reading device 201.

If the location of the terminal 203 is outside the signal reception range of the single position correction signal S201, and is in the signal reception range of a position correction signal S201 from another reading device 201, the terminal 203 receives the position correction signal S201 containing the identification information of the other value from the other reading device 201.

As the signal reception range associated with the position of the terminal 203 changes, the value of the identification information contained in the position correction signal S201 the terminal 203 receives therefore also changes.

The registered identification information data is thus data that is overwritten to express the value of the new identification information when the value of the identification information contained in the received position correction signal S201 changes. If the signal reception range in which the terminal 203 is located changed is therefore determined in step SB203.

If the values match in step SB203 (step SB203 returns YES), the terminal control unit 240 returns to step SB201. If the values do not match in step SB203 (step SB203 returns NO), the terminal control unit 240 replaces the registered identification information data stored in the terminal storage unit 241 with the value of the identification information acquired in step SB202 (step SB204).

Next, the terminal control unit 240 gets the reception signal strength of the position correction signal S201 received by the data communication unit 244 (step SB205).

Next, the terminal control unit 40 controls the network communication unit 243 to send reading device position information request data including the identification information acquired in step SB202 to a specific server and ask for the reading device position information (step SB206). This reading device position information is information indicating the position of the reading device 201 (such as information indicating the latitude and longitude of the position of the reading device 201). The data format of the reading device position information request data, the address of the server that sends the reading device position information, and the protocol used for communication with the server, are predetermined.

The server stores a relational database storing the identification information of the reading device 201 and the reading device position information indicating the position of the reading device 201 for each reading device 201. The reading device position information is overwritten appropriately according to the current position of the reading device 201 by a specific means to indicate the position of the reading device 201.

When the server receives the reading device position information request data sent by the terminal 203 in step SB206, it accesses the database and acquires the reading device position information related to the identification information by using the identification information contained in the request data as the search key.

Next, the server sends response data including the acquired reading device position information to the terminal 203.

The terminal control unit 240 then receives the response data sent by the server (step SB207).

Next, the terminal control unit 40 acquires the reading device position information contained in the received response data (step SB208).

Next, the terminal control unit 40 corrects the terminal position information stored by the terminal storage unit 241 based on the reception signal strength acquired in step SB205 and the reading device position information acquired in step SB208 (step SB209).

The application 200AP has a function for displaying a floor map of the floor 200F on the terminal display panel 242a of the terminal 203, and showing the position of the terminal 203 on the displayed floor map. The application 200AP also has a function for storing terminal position information indicating the position of the terminal 203 in the terminal storage unit 241.

The terminal control unit 240 displays the floor map on the terminal display panel 242a, and displays the position of the terminal 203 on the floor map based on the terminal position information stored by the terminal storage unit 241, by a function of the application 200AP. In step SB209, the terminal position information stored by the terminal storage unit 241 is corrected. Correcting the terminal position information is done by the following method, for example.

Knowing that reception signal strength decreases as the distance of the terminal 203 from the reading device 201 increases, the terminal control unit 240 calculates the distance between the reading device 201 and terminal 203. Next, the terminal control unit 240 calculates the direction of the position of the terminal 203 from the position of the reading device 201 based on the change in the position of the terminal 203. If the terminal 203 has a GPS function, the GPS function of the terminal 203 may be used to detect the direction of travel. Next, the terminal control unit 240 calculates the position of the terminal 203 based on the position of the reading device 201 indicated by the reading device position information and the calculated distance and direction of travel, and corrects the terminal position information stored by the terminal storage unit 241 to information indicating the calculated position of the terminal 203.

The terminal control unit 240 then returns to step SB201 after correcting the terminal position information.

As described above, the terminal 203 corrects the terminal position information based on the received position correction signal S201. Therefore, for a terminal 203 brought onto the floor 200F to correct the terminal position information with a high degree of accuracy, the position measurement system 205 must minimize the chances of the terminal 203 not being in any signal reception range, and the signal reception range associated with the terminal 203 must change appropriately according to the movement of the customer carrying the terminal 203. As described above, because the reading device 201 disposed at the entrance 200DG of a store T200 has a function for broadcasting a position correction signal S201 in this embodiment of the invention, the cost of building the system can be reduced, the system can be simplified, and the position measurement system 205 described above can be deployed.

The terminal position information may be used to provide services such as displaying a map of the floor 200F on the terminal display panel 242a of the terminal 203, and indicating the current position of the customer on the displayed map.

Operation of devices in the system after a customer's membership card is read by the reading device 201 is described next.

Figures 12A, 12B, 12C:
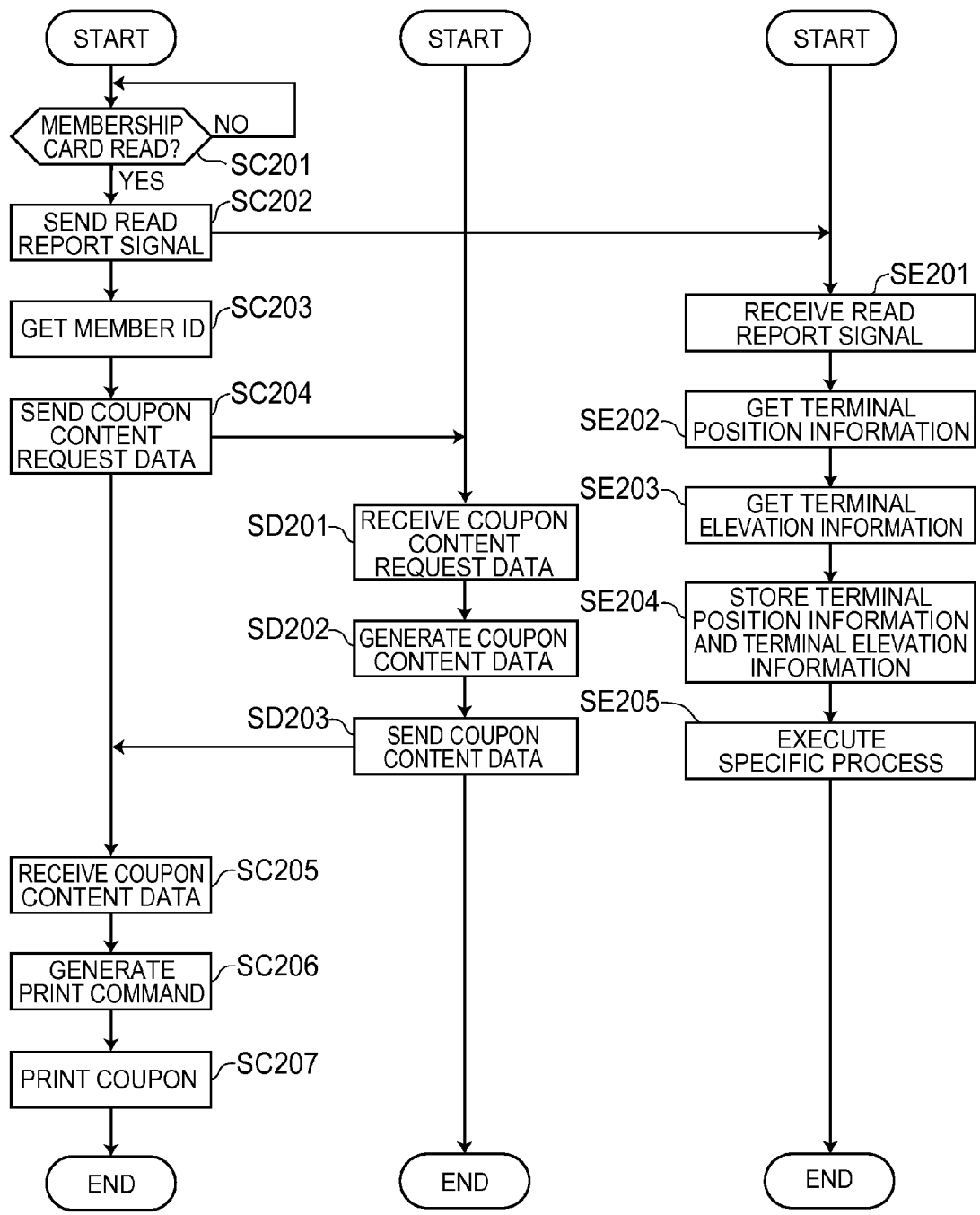
FIGS. 12A, 12B and 12C are flow charts illustrating the operation of devices in the reading system.

FIG. 12 is a flow chart of the operation of devices in the system after a customer's membership card is read by the reading device 201, column (A) showing the operation of the reading device 201, (B) showing the operation of the control server 202, and (C) showing the operation of the terminal 203.

In the following example, the terminal 203 is held by the customer whose membership card was read.

In addition, the terminal 203 displays a user interface on the display panel 211a enabling the customer to select whether or not to issue a coupon, and whether or not to send specific information to a previously registered mail address. Before reading the membership card with the IC card reader 229, the user selects whether or not to issue a coupon and whether or not to send mail by touching the touch panel 211. In this example, the customer has already chosen to issue a coupon and to not send mail.

As shown in FIG. 12 (A), the terminal control unit 240 of the terminal 203 determines if the membership card was read by the IC card reader 229 (step SC201). The terminal control unit 240 repeats step SC201 until the membership card is read.

To have the membership card read, the customer holds the membership card near the reading panel 218. A member ID is registered with the membership card, and the IC card reader 229 reads the member ID.

When the membership card has been read (step SC201 returns YES), the terminal control unit 240 controls the communication unit 222 to send a read report signal S202 indicating that the membership card was read by wireless communication (step SC202).

As shown in FIG. 12 (C), the terminal control unit 240 of the terminal 203 then controls the data communication unit 244 to receive the read report signal S202 (step SE201). When the membership card is read, the customer is located near the reading device 201. At this time, therefore, the terminal 203 of the customer is near the reading device 201. As a result, the customer's terminal 203 receives the read report signal S202 transmitted by the reading device 201 in conjunction with the customer having the membership card read.

Next, the terminal control unit 240 corrects the terminal position information based on the position correction signal S201 received after receiving the read report signal S202 and gets the corrected terminal position information (step SE202). As described above, the reading device 201 broadcasts the position correction signal S201 at a regular interval (such as 1 second). As a result, the terminal 203 receives the position correction signal S201 before this specific interval passes after receiving the read report signal S202, and triggered by receiving the signal executes the terminal position information correction process. In step SE202, the terminal control unit 240 acquires the terminal position information after the terminal position information is corrected based on the position correction signal S201 received after receiving the read report signal S202.

The terminal position information acquired by the terminal control unit 240 in step SE202 is terminal position information reflecting the correction made when the customer is near the reading device 201 that sent the read report signal S202. To correct the terminal position information, the terminal control unit 240 receives a position correction signal S201 with a high signal strength, and corrects the terminal position information with great accuracy.

Next, the terminal control unit 240 acquires terminal elevation information (step SE203). This terminal elevation information is information indicating the position of the terminal 203 on a vertical axis. For example, the terminal elevation information may be information indicating the floor number of the floor 200F the terminal 203 is on, or information indicating the vertical distance from a specific reference position.

In step SE203, the terminal control unit 240 acquires the terminal elevation information as described below, for example.

The terminal control unit 240 sends terminal elevation information request data containing the identification information of the reading device 201 to a specific server. This specific server relationally manages the identification information of the reading devices 201 and information indicating the position of the reading device 201 on the vertical axis (the elevation). In response to receiving the terminal elevation information request data, the specific server sends information indicating the vertical position of the reading device 201 identified in the request to the terminal 203.

The terminal 203 acquires the received information indicating the vertical position of the reading device 201 as the terminal elevation information identifying the vertical position of the terminal 203. As described above, when step SE203 executes, the reading device 201 and the terminal 203 are close together. The vertical position of the reading device 201 therefore corresponds to the vertical position of the terminal 203. As a result, the vertical position of the reading device 201 can be used as the vertical position of the terminal 203.

Alternatively, the read report signal S202 may be created to contain information that identifies the vertical position of the reading device 201 and can be used as the terminal elevation information, or the terminal elevation information may be acquired by other means.

Next, the terminal control unit 240 stores the terminal position information acquired in step SE202, and the terminal elevation information acquired in step SE203 in the terminal storage unit 241 (step SE204).

Next, the terminal control unit 240 executes a specific process using the terminal position information and the terminal elevation information stored in the terminal storage unit 241 as the reference position of the terminal 203 (step SE205).

For example, using a function of the application 200AP, the terminal control unit 240 may display a map of the floor 200F on the terminal display panel 242a, and display the location of the terminal 203 on the map. As described above, the terminal control unit 240 can display the position of the terminal 203 on the map with great accuracy because the terminal position information and the terminal elevation information are highly accurate information based on the terminal 203 being close to the reading device 201.

As shown in FIG. 12 (A), after sending the read report signal S202 in step SC202, the control unit 220 of the reading device 201 acquires the member ID based on the result of reading by the IC card reader 229 (step SC203).

Next, the control unit 220 controls the communication interface 225 and sends coupon content request data including the member ID through the network 200N to the control server 202 (step SC204). The format of the coupon content request data, the address of the control server 202 that returns the data, and the protocol for communication with the control server 202 are predetermined.

As shown in FIG. 12 (B), the control server 202 receives the coupon content request data (step SD201).

Next, the control server 202 generates coupon content data based on the member ID contained in the coupon content request data (step SD202). The coupon content data is data containing information identifying the content of the coupon to provide to the customer. The control server 202 manages the information identifying the content of the coupon to provide to the customer of the member ID based on the member ID. The information identifying the content of the coupon managed by the control server 202 is updated desirably by a specific means based on such conditions as the date, time, and the purchasing history of the customer.

Next, the control server 202 sends the coupon content data to the reading device 201 (step SD203).

As shown in FIG. 12 (A), the control unit 220 of the reading device 201 controls the communication interface 225 to receive the coupon content data (step SC205).

Next, based on the coupon content data, the control unit 220 generates control commands to control the print unit 221 to print a coupon printed with the information corresponding to the coupon content contained in the received data (step SC206).

Next, the control unit 220 controls the print unit 221 to produce a coupon based on the control commands generated in step SC206 (step SC207).

The reading device 201 thus produces a coupon for the customer appropriately to the result of reading the membership card.

Note that the reading device 201 may produce a ticket printed with a store T200 announcement, a specific advertisement, or sale information as the coupon. Because the membership card is read to produce the ticket, the printed information can also be information specific to the customer.

As described above, the reading device 201 according to this embodiment has a IC card reader 229 (reading unit) that reads information, a storage unit 223 that stores identification information, and a communication unit 222 that wirelessly transmits identification information stored in the storage unit 223.

Thus comprised, the reading device 201 can wirelessly transmit identification information used for position correction by the terminal 203. A system enabling position correction by the terminal 203 can thus be built, and a terminal 203 can receive identification information transmitted wirelessly by a reading device 201 and correct its position using the identification information, without needing to install specialized devices that communicate with the terminal 203 on a wall, or needing to install new equipment for operating the specialized devices, by simply installing a reading device 201 wherever a reading device 201 is used. The cost of constructing a system enabling position correction by the terminal 203 can therefore be reduced, and the system can be simplified.

A reading device 201 according to this embodiment has a print unit 221 that prints, and a control unit 220 that prints with the print unit 221 when information is read by an IC card reader 229.

Thus comprised, the reading device 201 can print with the print unit 221 based on information read by the IC card reader 229.

The control unit 220 of the reading device 201 according to this embodiment also controls the print unit 221 to print coupon information when information is read by an IC card reader 229.

Thus comprised, the reading device 201 can provide the user with a coupon printed with coupon information by printing a coupon based on information read by the IC card reader 229.

When information is read by an IC card reader 229, the communication unit 222 in this embodiment wirelessly transmits a signal indicating that information was read (read report signal S202).

Thus comprised, the reading device 201 can wirelessly transmit a read report signal S202 and inform the terminal 203 when information has been read by the IC card reader 229.

Furthermore, the terminal control unit 240 of the terminal 203 corrects position information based on reception of the read report signal S202.

Thus comprised, the terminal 203 can correct its position information when information is read by the reading device 201.

Variation 1 of Embodiment 2

A first variation of this embodiment is described next.

The reading device 201 may be configured to transmit the position correction signal S201 when information is read by the IC card reader 229. In this event, the reading device 201 may transmit the position correction signal S201 when information is read while continuing to broadcast the position correction signal S201 at the specific interval. Further alternatively, the reading device 201 may transmit the position correction signal S201 when information is read without broadcasting the position correction signal S201 at a specific interval.

In this embodiment, the reading device 201 can transmit the position correction signal S201 and cause the terminal 203 to correct its position when information is read by the IC card reader 229. As a result, when the user has information read with the reading device 201, the position correction signal S201 is sent from the reading device 201, and the terminal 203 held by the user can be triggered to correct its position information.

Variation 2 of Embodiment 2

A second variation of this embodiment is described next.

In this second variation of embodiment 2, a server (this server may be the same as the control server 202 described above in the second embodiment) connects through a network such as the Internet to the terminal 203.

In the above second embodiment, the terminal control unit 240 corrects the terminal position information indicating the position of the terminal 203 when the terminal 203 receives the position correction signal S201. In this second variation of the second embodiment, the server generates and sends the terminal position information to the terminal 203.

More specifically, when the terminal 203 receives a specific position correction signal S201, the terminal control unit 240 executes the following process. The terminal control unit 240 gets the reception signal strength of the received position correction signal S201, and sends the identification information contained in the signal and information indicating the reception signal strength through the network to the server.

The server then generates the terminal position information indicating the position of the terminal 203 using the same method described as the process of the terminal 203 in the second embodiment based on the received identification information and the reception signal strength information. Note that the method of generating the terminal position information is not limited to the method described above. The information used by the server to generate the terminal position information is also transmitted from the terminal 203 to the server.

The server then sends the terminal position information through the network to the terminal 203.

The terminal control unit 240 of the terminal 203 receives the terminal position information. Next, the terminal control unit 240 stores the received terminal position information in the terminal storage unit 241. Next, the terminal control unit 240 displays the location of the terminal 203 on the floor map displayed on the terminal display panel 242a based on the received terminal position information.

As described above, a configuration in which the terminal 203 sends specific information to a server when the position correction signal S201 is received by the terminal 203, and the server generates the terminal position information based on the specific information, is also conceivable. This configuration has the same effect as the effect of the second embodiment described above.

The invention is described above with reference to a preferred embodiment thereof, but the invention is not limited thereto and can be modified and adapted in many ways without departing from the scope of the accompanying claims.

For example, in the above second embodiment, the terminal 203 corrects the terminal position information when the terminal 203 moves into a different signal reception range. The timing for correcting the terminal position information is not limited to this example, however. For example, the terminal position information may be corrected whenever a specific time has passed, corrected when the terminal 203 has a means of detecting the distance traveled and the distance traveled equals or exceeds a specific distance, corrected with a specific condition is met, or corrected when commanded by the customer (user).

The specific position correction method of the terminal 203 is also not limited to the example described above. Any method that uses a signal received from the reading device 201 may be used for position correction.

Embodiment 3

A third embodiment of the invention is described next.

Figure 13:
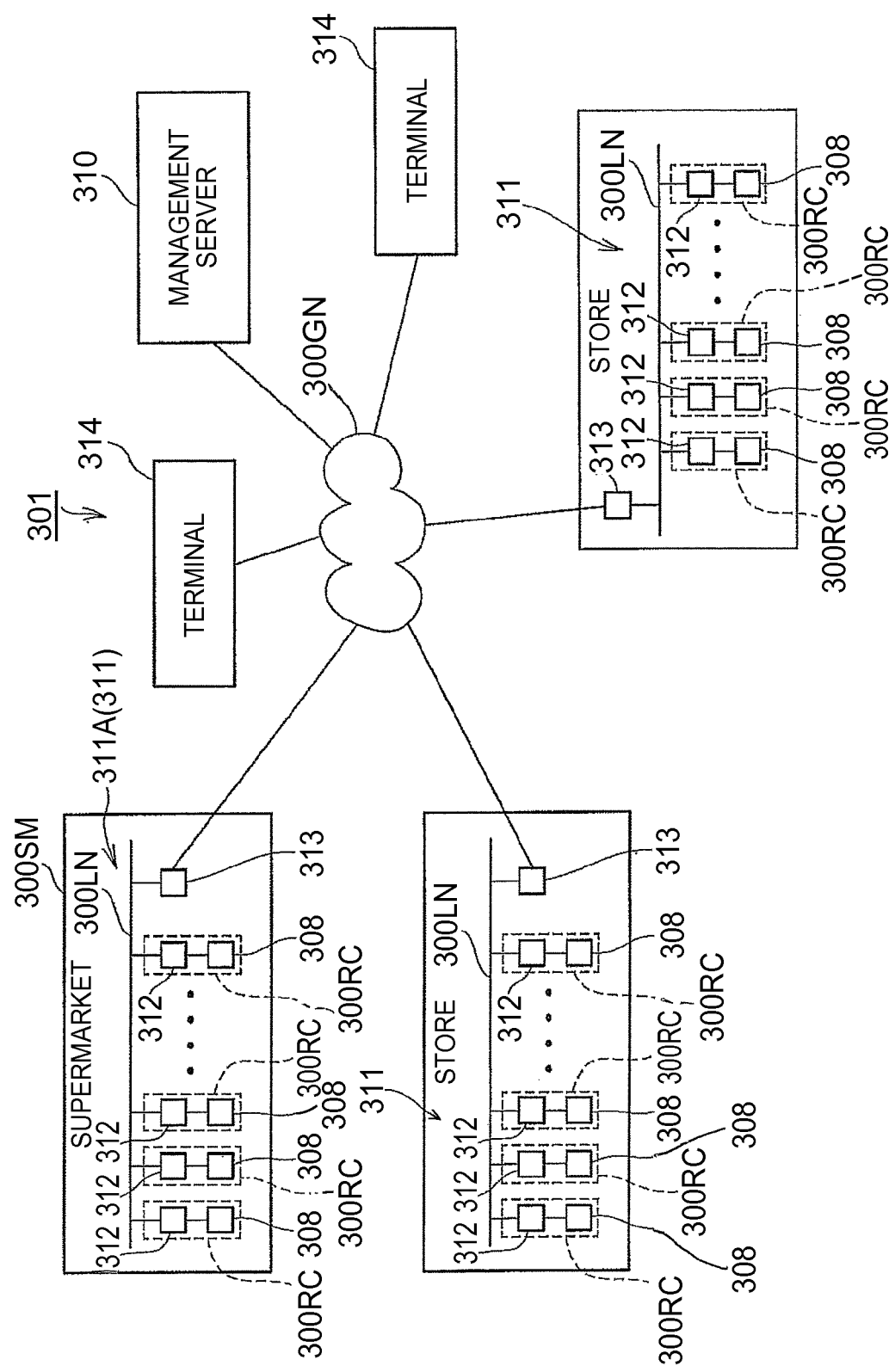
FIG. 13 illustrates the configuration of a POS system according to a third embodiment of the invention.

FIG. 13 shows the configuration of a POS system 301 according to this embodiment of the invention.

As shown in FIG. 13, the POS control system 301 includes a management server 310 (management device). A plurality of store systems 311 connect to the management server 310 through the Internet or other network 300GN. The store system 311 is a system that is used in retail businesses such as supermarkets, convenience stores, department stores, and restaurants. The store system 311 has functions including producing receipts for customers of the business.

The store system 311 has one or more printing devices 312 capable of producing receipts. Each printing device 312 is connected to a local area network 300LN deployed in the store. A network communication controller 313 configured with a communication device such as a network router or modem connects to the local area network 300LN. The printing devices 312 access the network 300GN through the network communication controller 313.

A POS terminal 308 connects to a printing device 312 in the store system 311. The POS terminal 308 has a POS application and printer driver installed thereto. As described further below, the POS terminal 308 controls the printing device 312 through the POS application and printer driver and prints receipts with the printing device 312.

One or more checkout counters RC are set up in the store. A printing device 312 and a POS terminal 308 connected to the printing device 312 are installed at each checkout counter RC.

In the example shown in FIG. 13, the store system 311A is a system used in a supermarket 300SM. Plural checkout counters 300RC are set up in the supermarket 300SM. A printing device 312 and POS terminal 308 are installed at each checkout counter 300RC. Customers purchasing goods at the supermarket 300SM process the transactions at a checkout counter 300RC. The POS terminal 308 runs a payment process according to the transaction, and sends receipt print data (printing information) instructing printing receipt information based on the transaction (payment process) to the printing device 312. Based on the received receipt print data, the printing device 312 produces a receipt. The issued receipt is then given to the customer.

A terminal 314 also connects to the network 300GN. The terminal 3 is a tablet-type cell phone (a smartphone) held by the customer. The terminal 3 may be any device that can execute the processes described below, and a tablet computer, notebook computer, or other type of personal computing device can be used as the terminal 3.

Figure 14:
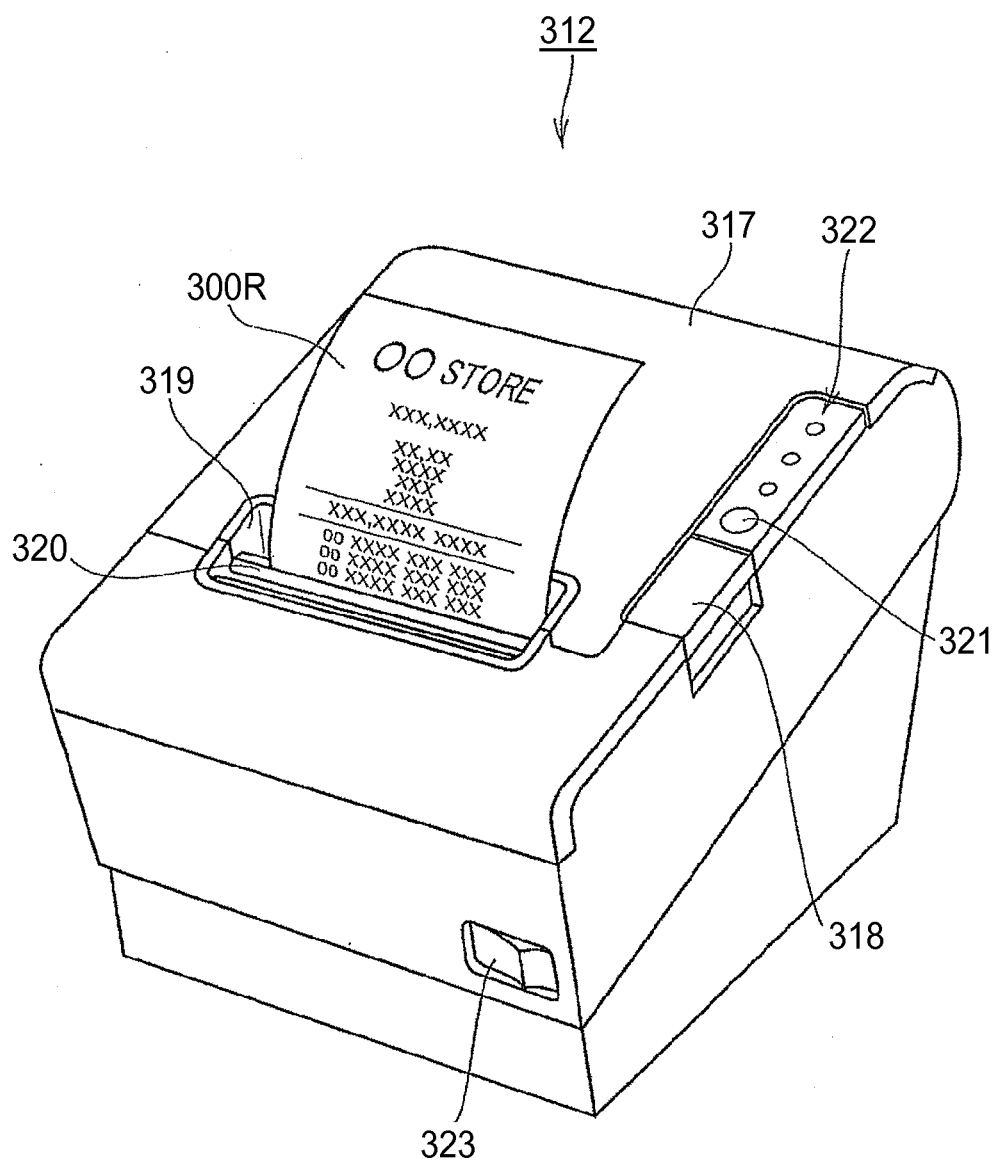
FIG. 14 is an oblique view of a printing device.

FIG. 14 is an oblique view of a printing device 312 according to a this embodiment of the invention.

The printing device 312 is a thermal line printer. The printing device 312 stores roll paper 300R. The printing device 312 conveys the stored roll paper 300R and prints on the roll paper 300R with a thermal head. The printing device 312 also has an access cover 317 that opens and closes. The access cover 317 is opened by depressing a lever 318 disposed to the top of the printing device 312. When the access cover 317 opens, the roll paper compartment where the roll paper 300R is stored is exposed, and the roll paper 300R can be replaced.

A paper exit 319 from which the roll paper 300R is discharged is formed in the top of the printing device 312. A cutter unit 320 that cuts the roll paper 300R is disposed inside the paper exit 319.

An operating panel is disposed to the top of the printing device 312 behind the lever 318. An operating switch 321 that instructs feeding the roll paper 300R, and an LED display unit 322 that indicate states of the printing device 312 and if an error occurred, for example, are disposed to this operating panel.

A power switch 323 for turning the power of the printing device 312 on and off is disposed at the front of the printing device 312.

Figure 15:
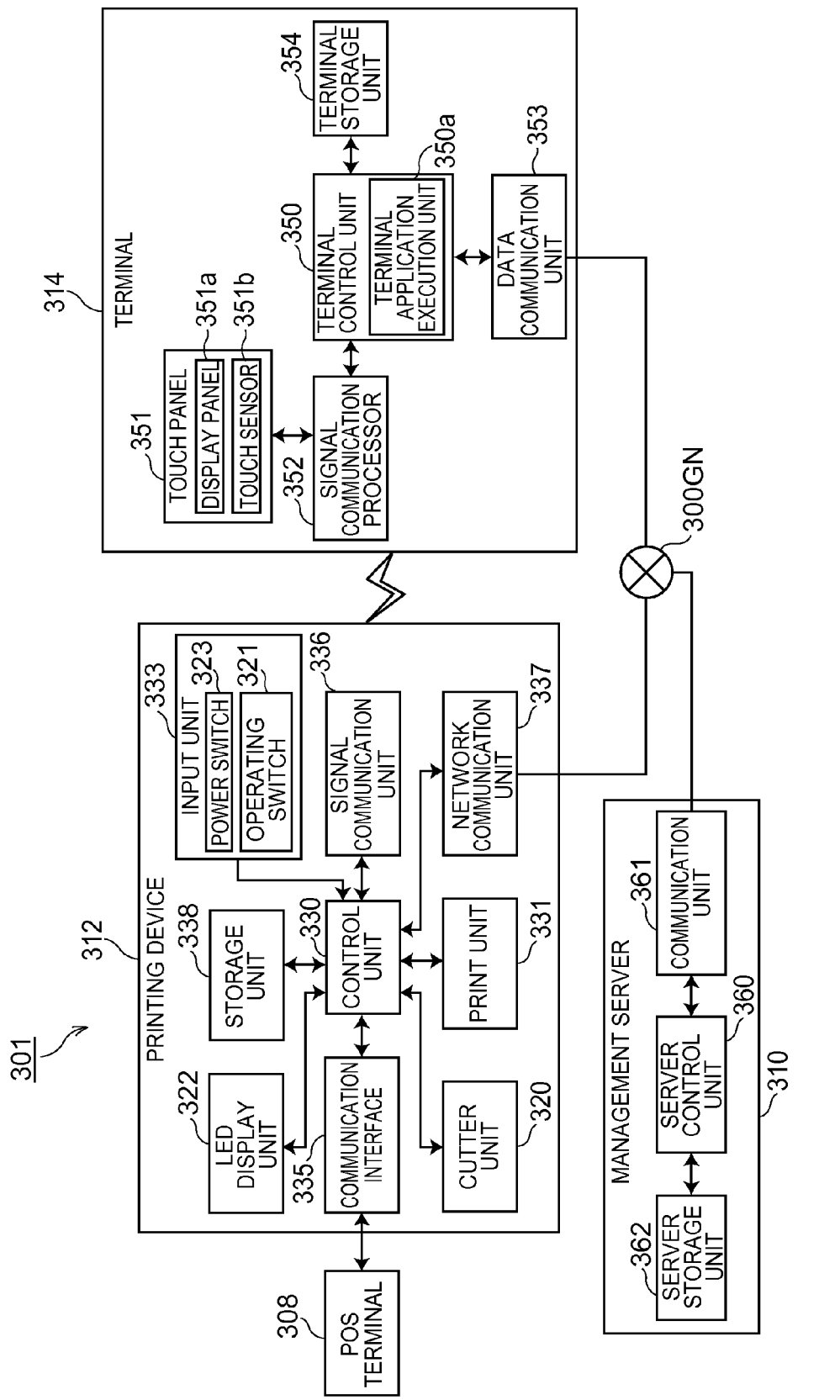
FIG. 15 is a block diagram illustrating the functional configuration of the POS system.

FIG. 15 is a block diagram showing the functional configuration of a POS system 301 according to this embodiment of the invention.

As shown in FIG. 15, the POS system 301 includes a POS terminal 308, a printing device 312, a terminal 314, and a management server 310.

As shown in FIG. 15, the printing device 312 includes a control unit 330, a print unit 331, a cutter unit 320, an LED display unit 322, an input unit 333, a communication interface 335 (reception unit), a signal communication unit 336, a network communication unit 337, and a storage unit 338.

The control unit 330 includes a CPU, ROM, RAM, and other peripheral circuits, and controls the printing device 312. The control unit 330 controls the printing device 312 by reading and running firmware stored in ROM, for example.

The print unit 331 includes a thermal head, a conveyance mechanism for conveying the roll paper 300R, and other mechanisms and devices related to printing on the roll paper 300R, and forms dots and prints on the roll paper 300R as controlled by the control unit 330.

The input unit 333 includes the operating switch 321 and power switch 323, detects operation of these switches, and outputs to the control unit 330.

The communication interface 335 communicates with the POS terminal 308 according to a specific communication protocol as controlled by the control unit 330.

The signal communication unit 336 includes an antenna, and a signal processing circuit for encoding, decoding, modulating, and demodulating data that is sent and received by wireless communication. The signal communication unit 336 transmits a beacon signal containing the information described below at the timing described below according to a specific communication protocol as controlled by the control unit 330.

The network communication unit 337 communicates with other devices (such as the management server 310) connected to the network 300GN through the network 300GN according to a specific communication protocol as controlled by the control unit 330.

The storage unit 338 includes nonvolatile memory, and stores data. The storage unit 338 stores position information described below and unique information.

As shown in FIG. 15, the terminal 314 includes a terminal control unit 350, a touch panel 351, a signal communication processor 352, a data communication unit 353 (data transmission unit), and a terminal storage unit 354.

The terminal control unit 350 includes a CPU, ROM, RAM, and other peripheral circuits and controls the terminal 314.

The touch panel 351 includes a display panel 351a disposed to the front of the terminal 314, and a touch sensor 351b disposed over the display panel 351a. The display panel 351a is a display such as an LCD panel or OLED panel. The touch sensor 351b is a capacitive or pressure sensitive sensor, detects the operator's touch operations with a finger or stylus, and outputs to the terminal control unit 350.

The signal communication processor 352 receives a beacon signal (described further below) transmitted by the terminal 3 as controlled by the terminal control unit 350.

The data communication unit 353 communicates with devices connected to the network 300GN (such as the management server 310) through the network 300GN according to a specific communication protocol as controlled by the terminal control unit 350.

The terminal storage unit 354 includes nonvolatile memory and stores data.

A specific application (referred to below as a terminal application AP) is preinstalled to the terminal 314. This terminal application AP is software with a function for controlling the printing device 312, a function for communicating with the printing device 312, and other functions related to the printing device 312. The terminal control unit 350 of the terminal 314 includes a terminal application execution unit 350a that runs the terminal application AP and executes processes.

The management server 310 is a server device that connects to the network 300GN, and includes a server control unit 360, a communication unit 361, and a server storage unit 362 (management device storage unit).

The server control unit 360 includes CPU, ROM, RAM, and other peripheral circuits, and controls the management server 310.

The communication unit 361 communicates with devices connected to the network 300GN through the network 300GN according to a specific communication protocol as controlled by the server control unit 360.

The server storage unit 362 is nonvolatile memory and stores data.

As described above, the POS system 301 produces receipts on a paper medium according to customer transactions in the store. In addition to providing paper receipts, the POS system 301 according to this embodiment can also provide electronic receipts to customers completing transactions. More specifically, the POS system 301 can provide an electronic receipt to a customer without the customer needing to remove and swipe a membership card over a specific device, for example.

The operation of devices in the POS system 301 is described below.

Figures 16A, 16B, 16C, 16D:
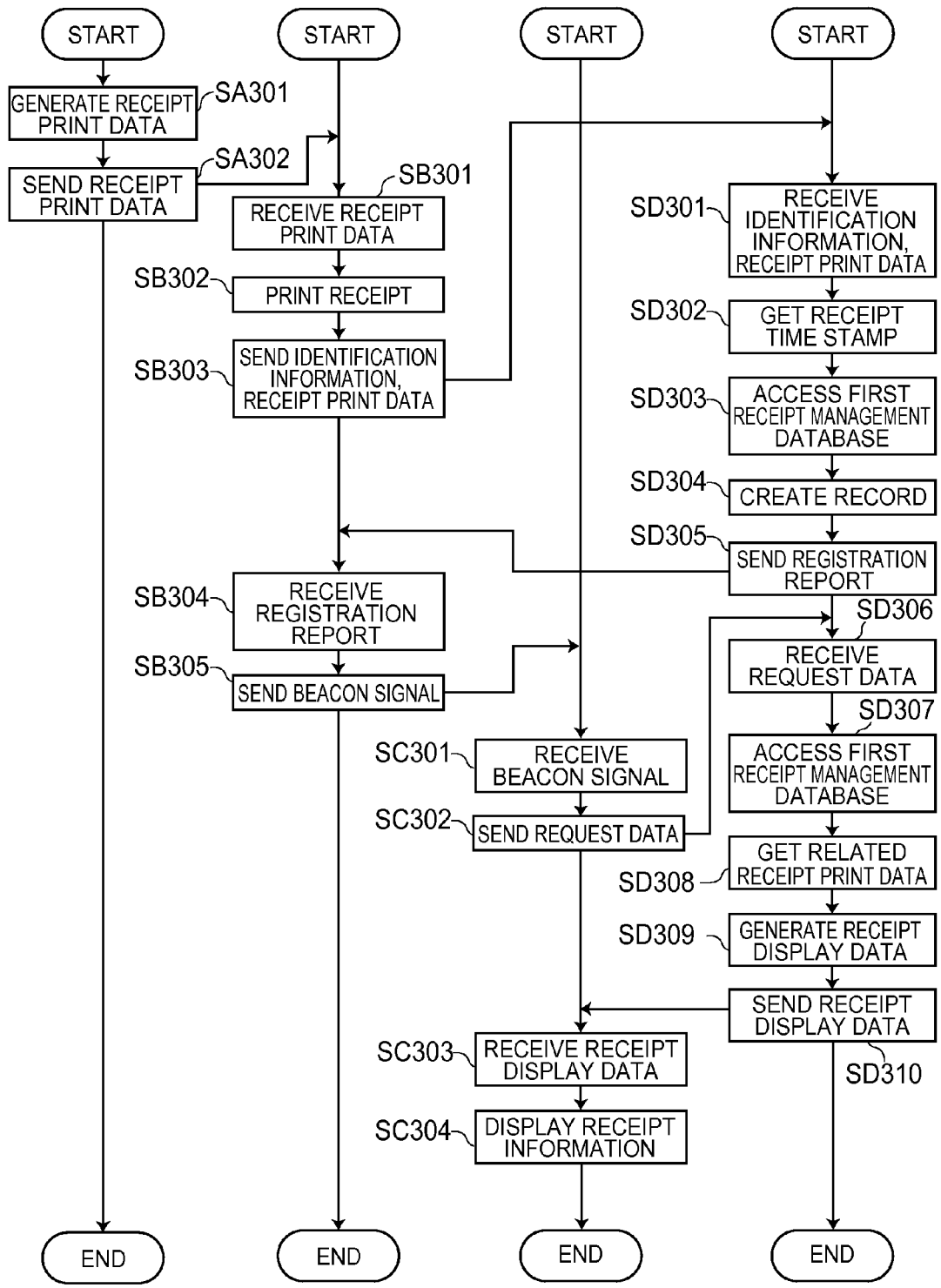
FIGS. 16A, 16B, 16C and 16D are flow charts illustrating the operation of devices in the POS system.

FIG. 16 is a flow chart showing the operation of devices in the POS system 301, (A) showing the operation of the POS terminal 308, (B) showing the operation of the printing device 312, (C) showing the operation of the terminal 314, and (D) showing the operation of the management server 310.

In FIG. 16, the terminal 314 is used by the customer in a transaction, and the printing device 312 is disposed to the checkout counter 300RC where the customer performs the transaction. Therefore, while the customer is performing the transaction, that is, while the customer is at the checkout counter 300RC, the terminal 314 is close enough to the printing device 312 that it can receive the beacon signal (described below) the printing device 312 transmits wirelessly.

As shown in FIG. 16 (A), the POS terminal 308 executes a payment process appropriately to the customer transaction, and generates receipt print data based on the payment process (step SA301). The receipt print data is also referred to as the printing information.

More specifically, function the function blocks of the POS terminal 308 include a POS application execution unit that runs a POS application, and a printer driver execution unit that runs a printer driver.

The POS application execution unit generates receipt information including the information to print on a receipt according to the customer transaction. The receipt information is information including, for example, a logo printed on the receipt; when the receipt is printed; the names, prices, and quantities of the products the customer purchased; tax-related information; the subtotal; the amount received from the customer; the amount of change due; or other information. While not shown in the figures, a barcode reader that read barcodes from products or product packaging, and a card reader that reads cards such as customer membership cards, are connected to the POS terminal 308. When processing a transaction for a customer of the business, the POS application execution unit gets information from product master and customer master databases and generates the receipt information based on input from the barcode reader, the card reader, or input by the checkout clerk through a keypad or other input means.

After generating the receipt information, the printer driver execution unit generates receipt print data, which is control data based on the command language of the printing device 312, instructing printing the receipt information.

Next, the POS terminal 308 sends the generated receipt print data to the printing device 312 (step SA302).

As shown in FIG. 16 (B), the control unit 330 of the printing device 312 controls the communication interface 335 to receive the receipt print data (step SB301).

Next, the control unit 330 controls the print unit 331 and cutter unit 320, for example, based on the receipt print data to print the receipt information on the roll paper 300R and produce a receipt (step SB302).

Note that an electronic receipt is provided to the customer in this embodiment of the invention. The system may therefore be configured to not produce a paper receipt. Further alternatively, a configuration that enables previously setting whether or not to product a paper receipt is also conceivable.

Next, the control unit 330 controls the network communication unit 337 to send the receipt print data and identification information for the printing device 312 to the management server 310 (step SB303).

Note that information used for communication with the management server 310, such as the address of the management server 310, is stored in the printing device 312. In step SB303, the control unit 330 controls the network communication unit 337 to establish a connection with the management server 310, and sends the data through the connection.

The identification information of the printing device 312 is information uniquely identifying a particular printing device 312, such as the serial number of the printing device 312. Note that position information identifying the location where the printing device 312 is installed (such as information including the latitude and longitude) may be sent to the management server 310 instead of the identification information of the printing device 312 or in addition to the identification information.

The storage unit 338 stores the identification information or the position information.

As shown in FIG. 16 (D), the server control unit 360 of the management server 310 controls the communication unit 361 to receive the receipt print data and the identification information (step SD301).

Next, the server control unit 360 gets the receipt time stamp information (step SD302). The receipt time stamp identifies when the receipt (the receipt printed by the process in step SB302) based on the corresponding receipt print data was printed. For example, the server control unit 360 may acquire the date and time the data was received in step SD301 as the receipt time stamp. Further alternatively, if information indicating when the receipt is printed is contained in the receipt print data, the server control unit 360 may extract that information and use the date/time the information indicates as the receipt time stamp.

Next, the server control unit 360 accesses a first receipt management database DB301 stored by the server storage unit 362 (step SD303).

The first receipt management database DB301 is a database relationally storing the identification information, receipt time stamp, and receipt print data.

Next, the server control unit 360 creates one record in the first receipt management database DB301, and stores the identification information received in step SD301, the receipt time stamp acquired in step SD302, and the receipt print data acquired in step SD301 (step SD304).

Note that the first receipt management database DB301 may be configured to relationally store the position information, receipt time stamp, and receipt print data. In this configuration, the printing device 312 sends the position information to the management server 310 in step SB303. The printing device 312 also sends a beacon signal (wireless signal) containing the position information to the terminal 314 in step SB305 described below, and the terminal 314 sends request data including the position information to the management server 310 in step SC302 described below.

Next, the server control unit 360 generates registration report data reporting that creation of the record in the first receipt management database DB301 was completed, and controls the communication unit 361 to send the registration report data to the printing device 312 (step SD305).

As shown in FIG. 16 (B), the control unit 330 of the printing device 312 controls the network communication unit 337 to receive the registration report data (step SB304).

Next, the control unit 330 controls the signal communication unit 336 to send the beacon signal containing the identification information to the terminal 314 wirelessly (step SB305). The printing device 312 thus sends a beacon signal (wireless signal) based on receiving the receipt print data (printing information).

As shown in FIG. 16 (C), the terminal application execution unit 350a of the terminal control unit 350 of the terminal 314 then receives the beacon signal by the signal communication processor 352 (step SC301).

Next, the terminal application execution unit 350a creates request data including the identification information and requesting providing an electronic receipt based on the received beacon signal, and controls the data communication unit 353 to send the request to the management server 310 (step SC302).

Note that the terminal application execution unit 350 manages the information used to communicate with the management server 310, including the address of the management server 310. In step SC302, the control unit 330 controls the data communication unit 353 to open a connection with the management server 310 and send the data through the connection.

As shown in FIG. 16 (D), the server control unit 360 of the management server 310 controls the communication unit 361 to receive the request data (step SD306).

Next, the server control unit 360 accesses the first receipt management database DB301 (step SD307).

Next, the server control unit 360 acquires the receipt print data related to the identification information from the first receipt management database DB301 using the identification information contained in the request received in step SD306 as the search key (step SD308).

Note that if there are plural receipt print data records related to the same identification information, the server control unit 360 gets the receipt print data with the receipt time stamp that is closest to the current time.

Next, the server control unit 360 generates receipt display data based on the receipt print data acquired in step SD308 (step SD309). The receipt display data is a display file in a specific format for displaying the receipt information. The specific file format may be a file in a markup language such as HTML or XML, or a PDF file, for example. The file format of the receipt display file is specified in the request data, and the server control unit 360 has a function for generating the receipt display data in the specified file format based on the receipt print data.

Next, the server control unit 360 the controls the communication unit 361 to send the generated receipt display data to the terminal 314 (step SD310).

As shown in FIG. 16 (C), the terminal application execution unit 350a of the terminal control unit 350 of the terminal 314 controls the data communication unit 353 to receive the receipt display data (step SC303).

Next, the terminal application execution unit 350a displays the receipt information based on the receipt display data on the display panel 351a of the touch panel 351 (step SC304).

The receipt information displayed based on the receipt display file corresponds to an electronic receipt.

As described above, the customer can receive an electronic receipt for a transaction without needing to remove a membership card, for example.

Note that in the configuration described above the printing device 312, management server 310, and terminal 314 execute their respective processes after the customer completes a transaction, and the receipt display data is sent automatically from the management server 310 to the terminal 314. Alternatively, the management server 310 may send the receipt display data to the terminal 314 at a desired time based on a customer request after completing the transaction. More specifically, the customer may send the identification information or position information to the management server 310 at a desired time by a specific means. Based on receiving the identification information or position information, the management server 310 selects the corresponding receipt print data, and generates and sends the receipt display data based on the selected receipt print data.

The management server 310 may also generate and send data other than receipt display data to the terminal 314 based on the receipt print data. For example, coupon display data for displaying coupon information reflecting the customer's transaction may be generated and sent to the terminal 314 based on the receipt print data.

As described above, the POS system 301 according to this embodiment of the invention includes a POS terminal 308, a printing device 312, and a terminal 314.

The POS terminal 308 executes a payment (transaction) process and outputs receipt print data (printing information) based on the payment process.

The printing device 312 includes a communication interface 335 (reception unit) that receives printing information; a signal communication unit 336 that sends a beacon signal (wireless signal) based on reception of the receipt print data; a network communication unit 337 that transmits the receipt print data; and a print unit 331 that prints.

The terminal 314 includes a data communication unit 353 that receives the beacon signal, and a terminal control unit 350 that executes a process based on the beacon signal.

Thus comprised, when the POS terminal 308 runs a payment process based on a transaction by a customer (user), the printing device 312 sends a beacon signal or sends receipt print data received from the POS terminal 308 to the customer's terminal 314. The terminal 314 then executes a process based on the beacon signal received from the printing device 312. As a result, the terminal 314 can detect that a transaction was done by receiving the beacon signal, execute a process based on the beacon signal, and provide a specific service to the customer. Therefore, the customer can receive a specific service through the terminal 314 without removing and presenting a membership card, for example.

The terminal control unit 350 of the terminal 314 in this embodiment of the invention also generates request data (data) by a process based on the beacon signal. The terminal 314 has a data communication unit 353 (data transmission unit) that transmits the generated request data. The POS system 301 also includes a management server 310 (management device) with a communication unit 361 that receives the request data sent by the data communication unit 353 of the terminal 314.

Thus comprised, the management server 310 can execute a process based on request data received from a terminal 314.

The printing device 312 in this embodiment of the invention has a storage unit 338 that stores position information indicating where the printing device 312 is located, or identification information for the printing device 312. The beacon signal includes the position information or the identification information. The request data also includes the position information or the identification information.

Thus comprised, the terminal 314 can send request data including the position information or the identification information of the printing device 312 to the management server 310, and the management server 310 can execute a process using the position information or the identification information.

In this embodiment of the invention, the network communication unit 337 of the printing device 312 sends receipt print data, and the position information or identification information stored in the storage unit 338, to the management server 310. The communication unit 361 of the management server 310 receives the receipt print data and the position information or the identification information. The management server 310 has a server storage unit 362 (management device storage unit) that stores the printing information, and the position information or the identification information, received by the communication unit 361.

Thus comprised, the management server 310 selects the related receipt print data triggered by receiving the position information or the identification information, and can execute a process based on the selected receipt print data.

Variation of Embodiment 3

A variation of the first embodiment is described next.

Note that elements that are the same in this variation as in the first embodiment described above are identified by like reference numerals, and further description thereof is described below.

In this variation of the third embodiment, the signal communication unit 336 of the printing device 312 has a function for communicating according to the Bluetooth (T) standard as controlled by the control unit 330. The signal communication processor 352 of the terminal 314 also has a function for communicating according to the Bluetooth (T) standard as controlled by the terminal control unit 350.

The terminal application AP of the terminal 314 has already been started before the process described with reference to FIG. 17 starts. The terminal application execution unit 350a looks for a printing device 312 with which it can communicate, and opens a Bluetooth connection with the printing device 312 if one is found. As a result, communication between the terminal 314 and the printing device 312 is possible while the customer performs the transaction, and data can be exchanged between the devices wirelessly according to the Bluetooth standard. Note that any appropriate method may be used to establish a communication connection between the printing device 312 and terminal 314.

Figures 17A, 17B, 17C, 17D:
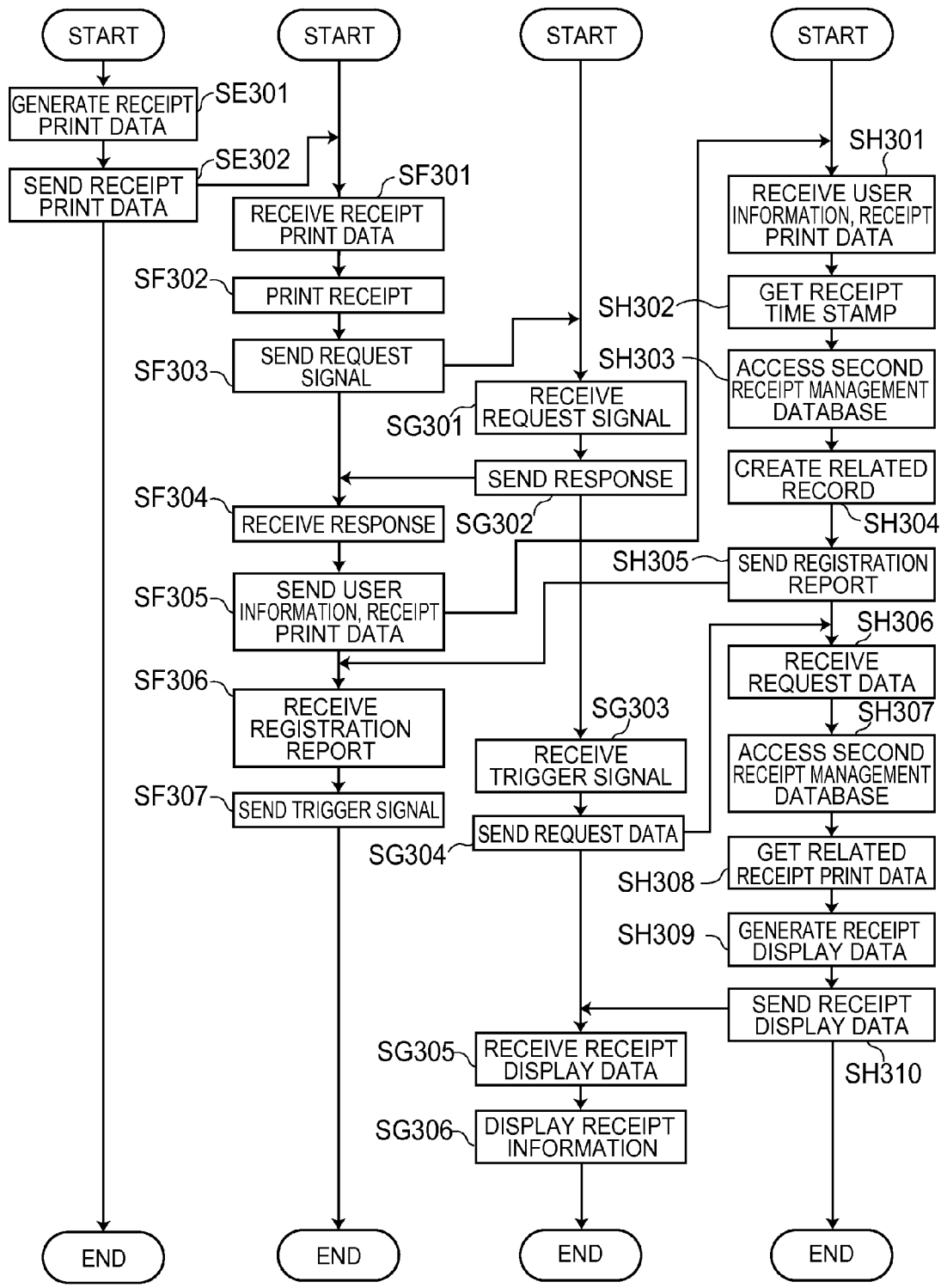
FIGS. 17A, 17B, 17C and 17D are flow charts illustrating the operation of devices in the POS system according to a variation of the third embodiment.

As shown in FIG. 17 (A), the POS terminal 308 executes a payment process according to the customer transaction, generates receipt print data based on the payment process (step SE301), and sends the receipt print data to the printing device 312 (step SE302).

As shown in FIG. 17 (B), the control unit 330 of the printing device 312 controls the communication interface 335 to receive the receipt print data (step SF301).

Next, the control unit 330 controls the print unit 331 and cutter unit 320, for example, based on the receipt print data to print the receipt information on the roll paper 300R and produce a receipt (step SF302).

Printing a paper receipt may also be omitted in this configuration as described in the third embodiment described above.

Next, the control unit 330 controls the signal communication unit 336 to send a request signal (wireless signal) including a command asking for user information to the terminal 314 (step SF303). The printing device 312 thus sends a request signal (wireless signal) triggered by receiving receipt print data (printing information).

As shown in FIG. 17 (C), the terminal application execution unit 350a of the terminal control unit 350 of the terminal 314 controls the signal communication processor 352 to receive the request signal (step SG301).

Next, the terminal application execution unit 350a generates a response signal with the user information (second wireless signal) based on the received request signal, and controls the signal communication processor 352 to send the response to the printing device 312 (step SG302).

The user information is identification information identifying a specific customer, and may be a previously registered user ID or identification information assigned to the terminal 314. What information is used as the user information is determined in advance. The terminal storage unit 354 stores the user information.

As shown in FIG. 17 (B), the control unit 330 of the printing device 312 controls the signal communication unit 336 to receive the response signal (step SF304).

Next, the control unit 330 controls the network communication unit 337 to send the user information contained in the response signal, and the receipt print data received in step SF301, to the management server 310 (step SF305).

The information used for communication with the management server 310, such as the address of the management server 310, is stored in the printing device 312. In step SF305, the control unit 330 controls the network communication unit 337 to open a connection with the management server 310 and send the data through the connection.

As shown in FIG. 17 (D), the server control unit 360 of the management server 310 controls the communication unit 361 to receive the user information and the receipt print data (step SH301).

Next, the server control unit 360 gets the receipt time stamp (step SH302).

Next, the server control unit 360 accesses the second receipt management database DB302 stored by the server storage unit 362 (step SH303).

The second receipt management database DB302 is a database relationally storing the user information, receipt time stamp, and receipt print data.

Next, the server control unit 360 creates one record in the second receipt management database DB302, and stores the user information received in step SH301, the receipt time stamp acquired in step SH302, and the receipt print data received in step SH301 (step SH304).

Next, the server control unit 360 generates registration report data reporting that creation of the record in the second receipt management database DB302, and controls the communication unit 361 to send the registration report data to the printing device 312 (step SH305).

As shown in FIG. 17 (B), the control unit 330 of the printing device 312 controls the network communication unit 337 to receive the registration report data (step SF306).

Next, the control unit 330 generates a specific trigger signal, and controls the signal communication unit 336 to wirelessly send the trigger signal to the terminal 314 (step SF307).

As shown in FIG. 17 (C), the terminal application execution unit 350a of the terminal control unit 350 of the terminal 314 controls the signal communication processor 352 to receive the trigger signal (step SG303).

Next, the terminal application execution unit 350a generates request data including the user information and requesting an electronic receipt, and controls the data communication unit 353 to send the request to the management server 310 (step SG304).

Note that information used for communication with the management server 310, such as the address of the management server 310, is stored in the terminal 314. In step SG304, the terminal application execution unit 350a controls the data communication unit 353 to open a connection with the management server 310, and sends the data through the connection.

As shown in FIG. 17 (D), the server control unit 360 of the management server 310 controls the communication unit 361 to receive the request data (step SH306).

Next, the server control unit 360 accesses the second receipt management database DB302 (step SH307).

Next, the server control unit 360 gets the receipt print data related to the user information from the second receipt management database DB302 using the user information contained in the request received in step SH306 as the search key (step SH308).

Note that if there are plural receipt print data records related to the same user information, the server control unit 360 gets the receipt print data with the receipt time stamp that is closest to the current time.

Next, the server control unit 360 generates receipt display data based on the receipt print data acquired in step SH308 (step SH309).

Next, the server control unit 360 controls the communication unit 361 to send the generated receipt display data to the terminal 314 (step SH310).

As shown in FIG. 17 (C), the terminal application execution unit 350a of the terminal control unit 350 of the terminal 314 controls the data communication unit 353 to receive the receipt display data (step SG305).

Next, the terminal application execution unit 350a displays the receipt information based on the receipt display data on the display panel 351a of the touch panel 351 (step SG306).

The receipt information displayed based on the receipt display file corresponds to an electronic receipt.

As described above, the customer can receive an electronic receipt for a transaction without needing to remove a membership card, for example.

Note that in this variation of the third embodiment the terminal 314 accesses the management server 310 and receives receipt display data from the management server 310 when triggered by receiving a trigger signal from the printing device 312. Alternatively, the terminal 314 may access the management server 310 and receive receipt display data from the management server 310 when a specific time has passed from reception of the request signal. In this configuration, the specific time must be set to amount required for the management server 310 to create a record in the second receipt management database DB302. Further alternatively, the terminal 314 may intermittently request the receipt display data after receiving the request signal, and the management server 310 may send the receipt display data in response to the request from the terminal 314 when sending the receipt display data becomes possible.

The standard for communication between the printing device 312 and the terminal 314 is also not limited to Bluetooth.

As described above, the terminal control unit 350 of the terminal 314 in this variation of the third embodiment generates a response signal (second wireless signal) based on a request signal (wireless signal), and the signal communication processor 352 of the terminal 314 sends the response signal to the printing device 312 wirelessly. The signal communication unit 336 of the printing device 312 receives the response signal sent by the signal communication processor 352 of the terminal 314.

Thus comprised, the printing device 312 can execute a process based on the response signal received according to the transmitted request signal.

In this variation of the third embodiment, the request signal includes a command asking for the user information stored by the terminal 314, and the response signal carries the user information.

Thus comprised, the printing device 312 can acquire user information from the terminal 314, and execute a process based on the user information.

In this variation of the third embodiment, the network communication unit 337 of the printing device 312 sends the user information in the response signal. The POS system 301 includes a management server 310 having a communication unit 361 that receives the receipt print data and user information sent by the network communication unit 337 of the printing device 312, and a server storage unit 362 (management device storage unit) that relationally stores the user information and the receipt print data received by the communication unit 361.

Thus comprised, the management server 310 selects the related receipt print data based on reception of the user information, and can execute a process based on the selected receipt print data.

The invention is described above with reference to a preferred embodiment thereof, but the invention is not limited thereto and can be modified and adapted in many ways without departing from the scope of the accompanying claims.

For example, the printing device 312 is a thermal printer in the foregoing embodiment, but the printing method is not limited to thermal printing methods.

The function blocks in FIG. 15 also do not suggest a specific hardware configuration.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A processing system used in a facility, the processing system comprising:
   a printing device; and
   a terminal configured to communicate with the printing device;
   wherein the printing device comprises:
      a print head configured to print,
      a memory configured to store identification information of the printing device, and
      a signal processing circuit configured to wirelessly transmit the identification information via a radio antenna to the terminal; and
   wherein the terminal comprises:
      a communication interface configured to:
         receive the identification information from the printing device,
         send a request for a position of the printing device to a server, the request including the identification information, and
         receive a latitude and a longitude of the position of the printing device from the server in response to the request,
      a terminal storage configured to store terminal position information, and
      a terminal controller configured to correct the terminal position information based on the latitude and the longitude received from the server.

2. The processing system described in claim 1, the printing device further including:
   a power supply configured to supply power to the print head and the signal processing circuit; and
   a switch configured to change between a first mode supplying power to the print head and the signal processing circuit, and a second mode that stops supplying power to the print head and that keeps supplying power to the signal processing circuit to enable the signal processing circuit to transmit the identification information to the terminal.

3. The processing system described in claim 1, the printing device further including:
   a power supply configured to supply power to the print head and the signal processing circuit;
   a first switch configured to supply or interrupt power to the print head, and
   a second switch configured to supply or interrupt power to the signal processing circuit.

4. The processing system described in claim 1, the printing device further including:
   a controller configured to control the print head and to produce a receipt printed with transaction information.

5. The processing system described in claim 1, the printing device further including:
   a controller configured to control the print head and to produce a coupon printed with coupon information.

6. A POS system used in a facility, the POS system comprising:
   a POS terminal configured to execute a payment process and to transmit printing information based on the payment process to a printing device;
   the printing device including a receiver configured to receive the printing information from the POS terminal, a signal communicator configured to transmit a wireless signal including position information to a terminal, a network communicator configured to transmit the printing information and the position information to a management device, and a print head configured to print, the position information identifying latitude and longitude of a position of the printing device in the facility, the position information being stored in the management device and related to the printing information; and
   the terminal including a signal communication processor configured to receive the wireless signal including the position information from the printing device, and a data communicator configured to send the position information to the management device and to obtain the printing information from the management device by checking the position information stored in the terminal against the position information stored in the management device.

7. The POS system described in claim 6, further comprising:
   the management device including a signal processing circuit configured to receive the position information transmitted from the data communicator of the terminal, wherein
   the printing device further includes a memory configured to store identification information identifying the printing device, the identification information being stored in the management device and related to the printing information;

the wireless signal transmitted by the printing device to the terminal further contains the identification information; and the data communicator of the terminal is configured to send the identification information to the management device to check the identification information stored in the terminal against the identification information stored in the management device.

8. The POS system described in claim 7, wherein:

the network communicator of the printing device is configured to transmit the printing information, and the position information or the identification information stored in the memory, to the management device; the signal processing circuit of the management device is configured to receive the printing information, and the position information or the identification information; and the management device has a management device memory is configured to relationally store the printing information, and the position information or the identification information.

9. The processing system described in claim 7, wherein the management device configured such that if the management device stores plural printing information related to the same identification information, the management device gets one of the plural printing information having a receipt time stamp that is closest to the time at which the management device receives the identification information from the terminal.

10. The POS system described in claim 6, wherein:

the terminal controller of the terminal is configured to generate a second wireless signal based on the wireless signal;

the signal communication processor of the terminal is configured to wirelessly transmit the second wireless signal to the printing device; and the signal communicator of the printing device is configured to receive the second wireless signal transmitted by the signal communication processor of the terminal.

11. The POS system described in claim 10, wherein:

the wireless signal includes a command requesting user information stored by the terminal; and the second wireless signal contains the user information.

12. The POS system described in claim 11, wherein:

the network communicator of the printing device is configured to transmit the user information of the second wireless signal; and the management device comprising a signal processing circuit is configured to receive the printing information and the user information transmitted by the network communicator of the printing device, and a management device memory is configured to relationally store the printing information and the user information received from the network communicator.

13. A processing system used in a facility, the processing system comprising:

a processing device; and a terminal;

wherein the processing device comprises:

a processor configured to process information, a memory configured to store first identification information, and a first signal processing circuit configured to wirelessly transmit a first signal including the first identification information via a radio antenna to the terminal; and wherein the terminal comprises:

a data communicator configured to wirelessly receive a plurality of signals, including the first signal, respectively transmitted by a plurality of signal processing circuits, including the first signal processing circuit, a terminal storage configured to store position information identifying a position of the terminal in the facility, a terminal controller configured to determine whether the first signal is a strongest signal of the plurality of signals, and, when the first signal is the strongest signal of the plurality of signals, correct the position information based on the first identification information, and a display panel configured to display a position of the terminal on a map of the facility using the position information.

14. The processing system described in claim 13, wherein:

the signal processing circuit of the processing device is configured to send the identification information when information is processed by the processor.

15. The processing system described in claim 13, wherein:

the signal processing circuit of the processing device is configured to wirelessly transmit a signal reporting information was processed when information is processed by the processor;

the data communicator of the terminal is configured to receive the signal transmitted by the signal processing circuit; and the terminal controller of the terminal is configured to correct the position information based on reception of the signal.

16. The processing system described in claim 13, wherein:

after correcting the position information, the terminal controller of the terminal is configured to execute a specific process based on the corrected position information.

17. The processing system described in claim 13, further comprising:

a management device comprising:

a management device storage configured to store the identification information and the position information, a receiver configured to receive the identification information transmitted by the terminal, a position information calculator configured to calculate the position information of the terminal based on the identification information received by the receiver, and a transmitter configured to send the position information calculated by the position information calculator to the terminal, the terminal further comprising a transceiver configured to send the identification information to the management device and receives the position information from the management device, and the terminal storage configured to store the received position information.

18. The processing system described in claim 13, wherein:
the terminal controller
calculates a direction of the position of the terminal from the processing device based on a change in the position of the terminal,
estimates the distance from the processing device based on the reception signal strength of the identification information,
calculates the position of the terminal based on the calculated direction and the estimated distance, and
corrects the position information of the terminal.

* * * * *